US008192627B2

(12) United States Patent
Gallop et al.

(10) Patent No.: US 8,192,627 B2
(45) Date of Patent: Jun. 5, 2012

(54) BIO-OIL RECOVERY METHODS

(75) Inventors: Charles C. Gallop, Gower, MO (US);
Theron Cooper, Volga, SD (US); Kurt A. Dieker, Maize, KS (US)

(73) Assignee: ICM, Inc., Colwich, KS (US)

( * ) Notice: Subject to any disclaimer, the term of this patent is extended or adjusted under 35 U.S.C. 154(b) by 0 days.

(21) Appl. No.: 13/105,789

(22) Filed: May 11, 2011

(65) Prior Publication Data

US 2011/0283602 A1 Nov. 24, 2011

Related U.S. Application Data

(60) Provisional application No. 61/371,568, filed on Aug. 6, 2010, provisional application No. 61/420,674, filed on Dec. 7, 2010, provisional application No. 61/472,549, filed on Apr. 6, 2011.

(51) Int. Cl.
B01D 11/00 (2006.01)
B01D 17/04 (2006.01)
C10L 1/00 (2006.01)

(52) U.S. Cl. ............ 210/634; 44/302; 44/307; 44/308; 44/605; 210/708; 210/774; 210/804; 210/806; 554/20; 554/21

(58) Field of Classification Search .................. 210/634, 210/639, 708, 774, 787, 804–806; 44/301, 44/302, 307, 308, 605; 554/8.9, 20, 21, 177; 426/417, 425, 429, 431, 490–493; 208/15–17, 208/311, 322, 339
See application file for complete search history.

(56) References Cited

U.S. PATENT DOCUMENTS

| 2,126,368 | A  | * | 8/1938 | Colbeth ........................ 516/139 |
| 4,316,808 | A  |   | 2/1982 | Blair |
| 4,342,657 | A  |   | 8/1982 | Blair |
| 5,507,958 | A  |   | 4/1996 | White-Stevens |
| 6,254,914 | B1 | * | 7/2001 | Singh et al. .................... 426/482 |
| 7,497,955 | B2 |   | 3/2009 | Scheimann et al. |
| 7,566,469 | B2 |   | 7/2009 | Scheimann |
| 7,601,858 | B2 |   | 10/2009 | Cantrell |

(Continued)

FOREIGN PATENT DOCUMENTS

EP 1673053 A2 6/2006

(Continued)

OTHER PUBLICATIONS

Magurany, Kelly, "Letter RE: GRAS Approval for NALCO GR-8109 from Nalco Company Product Registration Group", Letter dated Jan. 10, 2011, 1 pg.

(Continued)

Primary Examiner — Joseph Drodge
(74) Attorney, Agent, or Firm — Clark IP Law, PLC

(57) ABSTRACT

An emulsion-breaking additive is combined with an emulsion concentrate to yield a reaction product and the emulsion concentrate is produced in a process stream and contains entrapped bio-oil. Subsequent phase separating can be accomplished with gravity separation and/or mechanical processing. The emulsion-breaking additive can be native to the process stream. Related systems and methods are also provided.

17 Claims, 9 Drawing Sheets

U.S. PATENT DOCUMENTS

| | | | |
|---|---|---|---|
| 7,608,729 | B2 | 10/2009 | Winsness et al. |
| 7,757,702 | B2 | 7/2010 | Henaut et al. |
| 7,767,836 | B2 | 8/2010 | Cheryan |
| 2003/0068415 | A1* | 4/2003 | Taylor et al. .................. 426/316 |
| 2004/0087808 | A1 | 5/2004 | Prevost et al. |
| 2005/0079270 | A1 | 4/2005 | Scheimann |
| 2006/0006116 | A1 | 1/2006 | Scheimann et al. |
| 2006/0041153 | A1 | 2/2006 | Cantrell et al. |
| 2007/0185219 | A1 | 8/2007 | Argillier et al. |
| 2007/0210007 | A1 | 9/2007 | Scheimann et al. |
| 2008/0110577 | A1 | 5/2008 | Winsness |
| 2008/0125612 | A1 | 5/2008 | Bruckmayer |
| 2008/0244965 | A1* | 10/2008 | Tarbet Kenneth .............. 44/385 |
| 2008/0299632 | A1 | 12/2008 | Winsness et al. |
| 2009/0062581 | A1* | 3/2009 | Appel et al. .................. 585/241 |
| 2009/0114394 | A1 | 5/2009 | Javora et al. |
| 2009/0250412 | A1 | 10/2009 | Winsness et al. |
| 2009/0259060 | A1 | 10/2009 | Cantrell et al. |
| 2010/0004474 | A1 | 1/2010 | Cantrell et al. |
| 2010/0028484 | A1 | 2/2010 | Kriesler et al. |
| 2010/0233761 | A1 | 9/2010 | Czartoski et al. |
| 2010/0256244 | A1 | 10/2010 | Rey et al. |

FOREIGN PATENT DOCUMENTS

| | | | |
|---|---|---|---|
| EP | 1784363 | A2 | 5/2007 |
| EP | 2094367 | A1 | 9/2009 |
| JP | 1038104 | A | 2/1989 |
| WO | WO-2005/036942 | A2 | 4/2005 |
| WO | WO-2005/036942 | A3 | 4/2005 |
| WO | WO-2006/017048 | A2 | 2/2006 |
| WO | WO-2006/017048 | A3 | 2/2006 |
| WO | WO-2008/076716 | A1 | 6/2008 |
| WO | WO-2010114552 | A1 | 10/2010 |
| WO | WO-2010/138110 | A1 | 12/2010 |
| WO | 2012018421 | A1 | 2/2012 |

OTHER PUBLICATIONS

International Application Serial No. PCT/US2011/036145, International Search Report and Written Opinion mailed Jan. 9, 2012.

International Application Serial No. PCT/US2011/036145, Search Report mailed Jan. 9, 2012.

International Application Serial No. PCT/US2011/036145, Written Opinion mailed Jan. 9, 2012.

Bothast, R. J, et al., "Biotechnological processes for conversion of corn into ethanol", App, Microbiol Biotechnol., 67, (2005), 19-25.

Kohl, Scott, "Ethanol 101-10: Drying—Production of DDGS", Ethanol Today, (Jun. 2004), 34-36.

Kohl, Scott, "Ethanol 101-2: Grinding Grain", Ethanol Today, (Aug. 2003), 42-43.

Kohl, Scott, "Ethanol 101-3: Cooking Mash", Ethanol Today, (Oct. 2003), 44-45.

Kohl, Scott, "Ethanol 101-4: Fermenting Mash", Ethanol Today, (Nov. 2003), 42-43.

Kohl, Scott, "Ethanol 101-5: Managing Stress Factors", Ethanol Today, (Jan. 2004), 36-37.

Kohl, Scott, "Ethanol 101-6: Distillation", Ethanol Today, (Feb. 2004), 36-38.

Kohl, Scott, "Ethanol 101-7: Dehydration", Ethanol Today, (Mar. 2004), 40-41.

Kohl, Scott, "Ethanol 101-8: Stillage Separation", Ethanol Today, (Apr. 2004), 36-38.

Kohl, Scott, "Ethanol 101-9: Evaporation", Ethanol Today, (May 2004), 36-37.

Kohl, Scott, "Ethanol 101: Overview of Ethanol Production", Ethanol Today, (Jul. 2003), 36-37.

"High Efficiency Stillage Evaporation", FEW Presentation, (Jun. 28, 2007), 12 pgs.

* cited by examiner

BIO-OIL RECOVERY METHODS

This application claims the benefit under 35 U.S.C. 119 (e) of U.S. Provisional Application Ser. No. 61/371,568 filed on Aug. 6, 2010 and U.S. Provisional Application Ser. No. 61/420,674 filed on Dec. 7, 2010, and U.S. Provisional Application Ser. No. 61/472,549 filed on Apr. 6, 2011, all of which are hereby incorporated by reference in their entireties.

BACKGROUND

The methods for producing various types of alcohol from grain generally follow similar procedures, depending on whether the process is operated wet or dry. One alcohol of great interest today is ethanol. Ethanol can be produced from virtually any type of grain, but is most often made from corn. Ethanol can also be made from various cellulosic sources. Ethanol production generates co-products which can be used as is or which can be further processed.

SUMMARY

Bio-oil processing streams can contain emulsions. In one embodiment, a method is provided which comprises combining an emulsion-breaking additive with an emulsion concentrate (or a stable emulsion) to yield a reaction product, wherein the emulsion concentrate (or the stable emulsion) is produced in a process stream and contains entrapped bio-oil. The process stream can further contain bio-oil bound to components in the process stream, bio-oil trapped by components in the process stream, or both, wherein the bound or trapped bio-oil is also released. The bio-oil can be a vegetable oil (e.g., corn oil) or animal fat.

In one embodiment, the process stream is produced by mechanically processing and the method can further comprise removing the emulsion breaking additive from the reaction product to yield the broken emulsion concentrate; and phase separating the broken emulsion concentrate to yield an aqueous phase and a bio-oil phase. In this embodiment, the phase separating can be accomplished with gravity separation or with mechanical processing.

In one embodiment the method further comprises phase separating the reaction product to yield an aqueous phase and a bio-oil phase. In this embodiment, the method can further comprise mechanically processing the broken emulsion concentrate to yield an aqueous phase and a bio-oil phase; and removing the emulsion breaking additive from the bio-oil phase.

In one embodiment, the emulsion breaking additive is removed by flash evaporation.

The process stream can be a bio-oil process stream having a moisture content of about 5% by weight, up to less than 30% by weight. In one embodiment, the process stream is concentrated thin stillage which is at least partially comprised of triglycerides. The emulsion breaking additive can be heated prior to being combined with the process stream.

The emulsion breaking additive can be a polar protic solvent such as ethanol or glycerol. In one embodiment recovery of bio-oil from the process stream and/or the emulsion concentrate or stable emulsion present or produced in the process stream is improved by up to 1 or 2 times higher, such as up to about 10 times or higher, including any ranges there between, possibly including orders of magnitude higher (e.g., in the range of hundreds or thousands times higher), as compared to recovery of free bio-oil and/or bio-oil present in an unstable emulsion by merely mechanically processing the process stream or merely heating and mechanical processing the process stream.

The emulsion breaking additive and the process stream can be combined at any suitable temperature such as at a temperature between about 22° C. and about 121° C.

In one embodiment, bio-oil is recovered from the bio-oil phase. In one embodiment, the bio-oil product contains less than 11% free fatty acids.

In one embodiment, a bio-oil recovery system is provided comprising a biomass processing facility (i.e., a biomass-based production facility) having one or more process streams and configured to produce a biofuel and a bio-oil-containing process stream, wherein the biomass processing facility (such as a alcohol production facility) includes a dewatering system for dewatering the bio-oil containing process stream to produce an emulsion concentrate containing entrapped bio-oil; and an emulsion breaking system configured to at least partially break the emulsion concentrate with an emulsion breaking additive so that the entrapped bio-oil is released.

In one embodiment, the emulsion breaking additive is native to the one or more process streams and the system further comprises a recovery system for recovering the released bio-oil. The recovery system can include a passive chemical processing system (e.g., gravity separation chamber) and/or a mechanical processing system.

The novel systems and methods described herein can recover bio-oil from virtually any type of bio-oil stream in a variety of biomass processing facilities, including any type of alcohol production facility, such as an ethanol production facility. In one embodiment, the biomass processing facility converts lignocellulosic biomass to biofuel.

BRIEF DESCRIPTION OF THE DRAWINGS

Some embodiments are illustrated by way of example and not limitation in the figures of the accompanying drawings in which.

DETAILED DESCRIPTION

Figure 1:
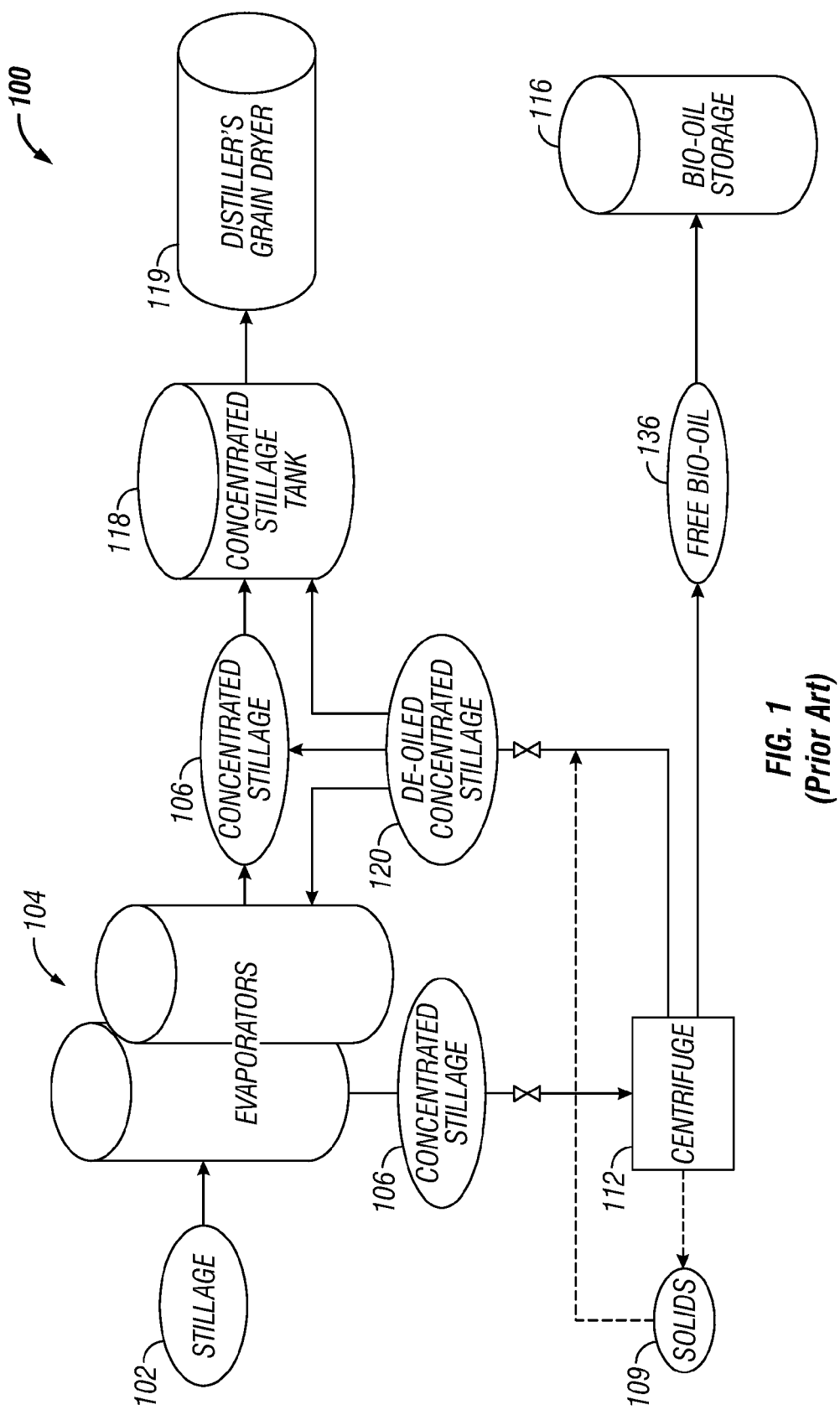
FIG. 1 is a simplified schematic illustration of a conventional bio-oil recovery system.

In the following detailed description, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present invention is defined only by the appended claims.

The various embodiments provide bio-oil recovery systems for recovering emulsified bio-oil from an emulsion concentrate or stable emulsion using an emulsion breaking additive, and methods related thereto. Although the systems and methods described herein focus primarily on recovering bio-oil from thin stillage resulting from ethanol production, any of the systems and methods described herein can be used to recover bio-oil from other bio-oil-containing streams in the ethanol production facility, from other biofuel production facilities, including various types of alcohol production facilities, and/or from facilities producing bio-oil from other types of biomass, further including ligno-cellulosic biomass.

The Detailed Description that follows begins with a brief definition section, followed by a detailed description of various embodiments of the invention, as well as an example section and conclusion.

DEFINITIONS

The term "biomass" as used herein, refers generally to organic matter harvested or collected from a renewable biological resource as a source of energy. The renewable biological resource can include plant materials (e.g., plant biomass), animal materials, and/or materials produced biologically. The term "biomass" is not considered to include non-renewable fossil fuels, such as coal, petroleum and natural gas. These types of fossil fuels are formed by natural processes (such as anaerobic decomposition of long dead, buried organisms) and contain hydrocarbons such as alkanes, cycloalkanes, and various aromatic hydrocarbons, but do not normally include glycerides (e.g., tri-, di-, mono-).

The terms "plant biomass" or "ligno-cellulosic biomass" as used herein, are intended to refer to virtually any plant-derived organic matter (woody or non-woody) available to produce energy on a sustainable basis. Plant biomass can include, but is not limited to, agricultural crop wastes and residues such as corn stover, wheat straw, rice straw, sugar cane, bagasse, and the like. Plant biomass can further include by-products of plant biomass, such as molasses, which is a viscous by-product from the processing of sugar cane, grapes or sugar beets into sugar. Plant biomass further includes, but is not limited to, woody energy crops, wood wastes and residues such as trees, which can include fruit trees, such as fruit-bearing trees, (e.g., apple trees, orange trees, and the like), softwood forest thinnings, barky wastes, sawdust, paper and pulp industry waste streams, wood fiber, and the like. The skins and/or rinds of the various fruits can also be used as plant biomass.

Additionally grass crops, such as various prairie grasses, including prairie cord grass, switchgrass, big bluestem, little bluestem, side oats grama, energy sorghum and the like, have the potential to be produced large-scale as additional plant biomass sources. For urban areas, potential plant biomass includes yard waste (e.g., grass clippings, leaves, tree clippings, brush, etc.) and vegetable processing waste. Plant biomass is known to be the most prevalent form of carbohydrate available in nature and corn stover is currently the largest source of readily available plant biomass in the United States.

The term "biofuel" as used herein, refers to any renewable solid, liquid or gaseous fuel produced biologically, such as bio-oils, including for example, bio-oils derived from biomass.

The term "bio-oil" as used herein, refers to food-grade and non-food grade oils and fats that are derived from plants and/or animals (e.g., vegetable oils and animal fats, which contain primarily triglycerides, but can also contain fatty acids, diglycerides and monoglycerides. (As used herein, the term "fat" is understood to include "lipids"). Examples of bio-oils derived from plants include, but are not limited to, corn oil, flaxseed oil, canola oil, and the like. See also the listing of biofuel sources noted in the definition for "agricultural biofuel" below, which are also useful as sources for bio-oil.

Most biofuels are originally derived from biological processes such as the photosynthesis process and can therefore be considered a solar or chemical energy source. Biofuels can be derived from biomass synthesized during photosynthesis, such as with agricultural biofuels (defined below). Other biofuels include algaculture biofuels (from algae), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries). Biofuels also include, but are not limited to, biodiesels, bioethanol (i.e., ethanol), biogasoline, biomethanol, biobutanol, and the like.

The term "agricultural biofuel" as used herein refers to a biofuel derived from agricultural crop (e.g., grains, such as corn and soybeans) plant biomass, crop residues, grain processing facility wastes (e.g., wheat/oat hulls, corn/bean fines, out-of-specification agricultural or biomass materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinsing/cleansing streams, etc.), value-added agricultural facility byproducts (e.g., distiller's grain of any moisture content and/or syrup from ethanol production facilities, etc.), and the like. Examples of livestock include, but are not limited to, cattle, pork, turkey or chicken. Examples of agricultural crops include, but are not limited to, any type of non-woody plant (e.g., cotton), grains, including any type of cereal grains such as corn, wheat, soybeans, sorghum, barley, oats, rye, milo, rape seeds, canola, sunflower, pennycress, and the like, herbs (e.g., peanuts), herbaceous crops such as switchgrass, alfalfa, other starch containing crops such as bagasse, sugarcane, and other oil-bearing starch or sugar based materials, and so forth. Ethanol and biodiesel are examples of agricultural biofuels.

The term "stillage" as used herein refers to a co-product produced during production of a biofuel, and is sometimes referred to as "slop". When used without qualification, the term "stillage" can refer to whole stillage, thin stillage, or concentrated stillage (such as condensed distillers soluble, i.e., syrup, which can be produced from biofuel process streams, e.g., ethanol production process streams). Such streams may have a free bio-oil component and an emulsified bio-oil component, or all of the bio-oil may be emulsified.

The term "free oil" or "free bio-oil" as used herein, refers to a bio-oil that is not emulsified, physically or chemically bound or trapped by components in the process stream and can be phase separated from the process stream, i.e., recovered from the process stream via mechanical processing and/or non-mechanical processing as defined herein.

The terms "emulsion" or "emulsified layer" as used herein refer to a mixture of two or more immiscible liquids, i.e., liquids which are sparingly soluble within each other. Emulsions are part of a more general class of two-phase systems of matter called colloids. Although the terms colloid and emulsion are sometimes used interchangeably, emulsion tends to imply that both the dispersed and the continuous phase are liquid. In an emulsion, one liquid (the dispersed phase) is dispersed in the other (the continuous phase) (Wikipedia http://en.wikipedia.org/wiki/Emulsion). Whether an emulsion becomes a water-in-oil emulsion or an oil-in-water emulsion depends on the volume fraction of both phases and on the type of emulsifier.

Generally, the Bancroft rule applies which suggests that emulsifiers and emulsifying particles tend to promote dispersion of the phase into which they are not well-dissolved; for example, proteins dissolve better in water than in oil. As a result, proteins tend to form oil-in-water emulsions, i.e., proteins promote the dispersion of oil droplets throughout a continuous phase of water.

An emulsion can contain entrapped components, such as bio-oil, as well as other components, including, but not limited to, starches, free fatty acids (FFA) (e.g., arachidic acid, stearic acid, palmitic acid, erucic acid, oleic acid, arachidonic acid, linoleic acid and/or linolenic acid), fatty acid lower (alkyl) esters, phospholipids, grain germ fractions, yeast, protein, fiber, glycerol, residual sugars, other organic compounds and/or other inorganic compounds such as anion and cation salts of organic acids (e.g., metallic salts such as sodium sulfate, sodium sulfite, magnesium sulfate and potassium phytate, magnesium phytate, magnesium phosphate, sodium carbonate, magnesium oxalate, calcium oxalate, caratenoids, and/or antioxidants).

The term "emulsion breaking" as used herein refers to a chemical treatment, i.e., chemical process, which causes destabilization of a stable emulsion or an emulsion concentrate, in which at least some of the stable emulsion or emulsion concentrate is broken to produce a broken emulsion, thus releasing entrapped bio-oil. As such, the term "emulsion breaking" is intended to include any type of stable emulsion "reduction" or emulsion concentrate "reduction" in which at least a portion of emulsified bio-oil in the stable emulsion or emulsion concentrate is released from an emulsified state by other than gravitational means. "Emulsion breaking" is in contrast to "phase separation."

The term "phase separation" or "phase separator" as used herein refers to a process or system during which an unstable emulsion separates into separate and distinct phases, such as occurs during creaming, e.g., the migration of bio-oil to the top (or the bottom, depending on the relative densities of the two phases) of the unstable emulsion under the influence of buoyancy. Phase separation is accomplished by a non-mechanical process or a mechanical process. A non-mechanical phase separation refers to a passive chemical process in which the phases separate via specific density separation due to the force of gravity, i.e., separation of a static solution. A mechanical phase separation refers to a process in which phases separate due to additionally or alternatively using a man-made force such, as a centripetal force, caused by a centrifuge.

The term "emulsion breaking additive" or "demulsifier" as used herein refers to an additive added in an amount sufficient to destabilize a stable emulsion or emulsion concentrate enough to cause emulsion breaking to release entrapped bio-oil. An emulsion breaking additive can further release bio-oil physically or chemically trapped or bound to components in the process stream. Such additives include alcohol-based compounds and surfactants (surface active agents or substances), such as ethanol and/or glycerol, which are capable of disrupting the hydrogen bonding and/or impacting the surface tension of the process stream.

The term "polar solvent" as used herein refers to a solvent having a dielectric constant or relative static permittivity of 15 or greater or a solvent which is miscible with water.

The term "protic polar solvent" as used herein refers to a polar solvent which solvates negatively charged solutes (anions) strongly via hydrogen bonding. Polar protic solvents are known to favor a unimolecular nucleophilic substitution reaction referred to as a Sn1 reaction.

The term "stable emulsion" as used herein, refers to an emulsion consisting essentially of a bio-oil phase and an aqueous phase and which is sufficiently stable for further processing in accordance with embodiments described herein.

The term "emulsifier" or "surfactant" (also known as an emulgent) as used herein refers to a substance which stabilizes an emulsion by increasing its kinetic stability (Wikipedia http://en.wikipedia.org/wiki/Emulsifier), The term "emulsion concentrate" as used herein refers to a stable emulsion (water-in-bio-oil or bio-oil-in-water) containing minor amounts of other components from a processing stream, such as from the processing streams described herein.

The term "mechanical processing" or "mechanical process" as used herein refers to interaction of a machine or device with any portion of a process stream sufficient to cause or alter motion of the process stream. Mechanical processing is accomplished with mechanical force and/or addition and/or reduction of kinetic energy.

The term "mechanical processor" or device as used herein refers to a machine or device (with or without moving parts) capable of carrying out mechanical processing and can further include a device capable of carrying out mechanical processing in combination with non-mechanical processing (such as the use of a centrifuge to add centripetal force to aid phase separation caused by gravity).

The term "non-mechanical processing" or "non-mechanical process" as used herein refers to a non-mechanical process which causes change in a process stream other than by imparting and/or altering motion of the processing stream. A non-mechanical process includes any type of chemical process such as gravity separation.

The term "non-mechanical processor" as used herein refers to a machine or device capable of carrying out non-mechanical processing on a process stream. One example of a non-mechanical processor is a gravity settling tank.

The term "chemical processing" or "chemical process" as used herein refers to a process that changes the composition of the process stream in one or more steps with or without the use of added components and with or without added (or reduced) heat and/or added or reduced pressure. A chemical reaction is one type of chemical process. One example of such a reaction is the emulsion breaking reaction described herein. Other examples of a chemical process include catalysis, coagulation and flocculation. A chemical process can also refer to a passive chemical process.

The term "passive chemical processing" or "passive chemical process" as used herein refers to a process which allows a chemical change to occur naturally in a process stream over time without adding additional components to the process stream and/or heating and/or pressurizing the process stream. Gravity separation of phases in a process stream is one example of a passive chemical process as it uses only the force of gravity to allow separation to occur.

The term "heavy water phase" as used herein refers to an aqueous stream containing suspended solids. The term solids" as used herein refers to a semi-solid paste material.

The term "aqueous phase" as used herein refers to a process stream containing primarily water and solids, and which can further contain an amount of emulsion breaking additive, as well as glycerin, acetic acid, sulfuric acid, residual soluble sugars, soluble proteins and trace minerals, such as Mg, Fe and Ca.

The term "bio-oil phase" as used herein refers to a process stream containing primarily bio-oil, and which can further contain an amount of emulsion breaking additive and other minor components.

The term "evaporation" as used herein refers to removal or vaporization of a solvent. Use of increased temperature and/or decreased pressure is one type of evaporation which is often referred to as "flashing" or "flash evaporation."

The term "reaction product" as used herein refers to a product resulting from the emulsion breaking reaction described herein, which produces a product containing either a broken emulsion concentrate (or a broken emulsion), together with the emulsion breaking, additive and the aqueous phase, as defined herein.

Ethanol Production Overview

Grain-based ethanol can be produced from a wet mill process, a dry grind ethanol process or a "modified" dry grind ethanol process as is understood in the art. See, for example, Kohl, S., Ethanol 101: Overview of Ethanol Production, *Ethanol Today*, July 2003, pp. 36-37 for a detailed description of a typical dry grind ethanol process, which is incorporated herein by reference in its entirety. Regardless of the specific process used (wet mill, dry grind or modified dry grind), conventional ethanol production results in useful co-products which, after mechanical processing, or heating and mechanical processing, are designed to recover free bio-oil and/or bio-oil present in an unstable emulsion.

In contrast, embodiments described herein do not recover free bio-oil and/or bio-oil present in an unstable emulsion after mere mechanical processing, or after merely heating and mechanical processing. (In the context of the systems and methods discussed herein, heating is not intended to refer to a chemical process). Instead, embodiments described herein initially utilize a mechanical processing step or a heating and mechanical processing step to further concentrate, i.e., dewater, co-products exiting the biomass processing facility, such as concentrated stillage or concentrated thin stillage, to produce a stable emulsion or an emulsion concentrate.

In various embodiments, the stable emulsion or, in other embodiments, the emulsion concentrate is thereafter subject to a chemical processing step, i.e., a nonmechanical emulsion concentrate breaking step, to produce a reaction product as defined herein. As noted herein, the emulsion concentrate (or, in other embodiments, the stable emulsion) is considered to be broken if even a portion of the emulsion concentrate (or, in other embodiments, the stable emulsion) is broken. As such, in one embodiment, at least a portion of the reaction product can be an unstable emulsion concentrate (or, in other embodiments, an unstable emulsion) at this stage. Thereafter, over a period of time, components of the reaction product can begin to coalesce as a result of density differences as compared with other components present, water (which can contain solids), emulsion breaking additive and bio-oil, to form or begin to form at least two separate phases. In one embodiment, the broken emulsion concentrate (or, in other embodiments, broken emulsion) phase separates into a bio-oil phase (which can still contain some, or all, of the emulsion breaking additive) and an aqueous phase (which can contain some of the emulsion breaking additive)

In one embodiment, phase separation is a non-mechanical process, i.e., a passive chemical process, with separation occurring merely as a result of gravity. In one embodiment, the phase separation can additionally or alternatively include a mechanical processing step to enhance and/or expedite the phase separation. As the phases separate, it is then possible to recover released bio-oil, i.e., free bio-oil, present in the bio-oil phase to be recovered. In one embodiment, removal of the emulsion breaking additive expedites phase separation. As described herein, the emulsion breaking additive can be removed prior to or concurrently with phase separation and/or can be removed from the bio-oil phase and/or the aqueous phase after phase separation.

Co-products produced as a result of distillation and dehydration include whole stillage, which is typically subject to a centrifugation or decanter step to separate the insoluble solids ("wet cake") from the liquid (which is oftentimes referred to as "centrate" until it enters a stillage tank, if present, at which point it is sometimes referred to as "thin stillage"). In a dry grind ethanol process, stillage enters evaporators in order to boil away moisture, producing a concentrated syrup containing the soluble (dissolved) solids from the fermentation. See, for example, Kohl, S., Ethanol 101-9: Evaporation, *Ethanol Today*, May 2004, pp 36-39, which is herein incorporated by reference in its entirety.

This concentrated syrup can be mixed with the centrifuged wet cake, and the mixture sold to beef and dairy feedlots as Distillers Wet Grain with Solubles (DWGS). Alternatively, the wet cake and concentrated syrup mixture may be dried and sold as Distillers Dried Grain with Solubles (DDGS) to dairy and beef feedlots. See, for example, Kohl, S., *Ethanol 101-10: Drying-Production of DDGS, Ethanol Today*, June 2004, pp. 34-36, which is herein incorporated by reference in its entirety.

A modified dry grind ethanol process (comprised of, generally a dry grind milling process with a wet mill fractionation and fermentation process) also typically produces a co-product containing free bio-oil which is traditionally recovered using mechanical processing or heating and mechanical processing as described above. In contrast, the embodiments described herein do not recover free bio-oil or bio-oil present in an unstable emulsion at this stage, but utilize a mechanical processing step or a heating and a mechanical processing step to further concentrate, i.e., dewater, the process stream, such as one or more co-products exiting a biomass processing facility.

It should be noted that those skilled in the art often define terms somewhat differently in a modified dry grind ethanol process as compared to a typical dry grind ethanol process. For example, stillage produced after centrifugation in a modified dry grind process is often referred to as "whole stillage," although it technically is not the same type of "whole stillage" produced with the dry grind process, since reduced insoluble solids are present. Others skilled in the art may refer to this type of stillage as "thin" stillage. The separated germ can be sold for corn oil extraction.

The separated corn fiber can be fermented to produce ethanol in an alternate process, or can be extracted for higher value chemicals and neutraceuticals. For a more detailed discussion of a prior art modified dry grind ethanol production process see, for example, U.S. Pat. No. 6,254,914 to Singh, et al., entitled, Process for Recovery of Corn Coarse Fiber (Pericarp), issued Jul. 3, 2001 and U.S. Patent Application 2003/0068415 to Taylor, et al., entitled, Method of Removing the Hull from Corn Kernels, published Apr. 10, 2003, both of which are incorporated herein by reference in their entireties.

Wet mill corn processing plants convert corn grain into several different co-products, such as germ (for oil extraction), gluten feed (high fiber animal feed), gluten meal (high protein animal feed), and starch-based products such as ethanol, high fructose corn syrup, or food and industrial starch. As with the modified dry grind process, the "stillage" produced after distillation and dehydration in the wet mill process is often referred to as "whole stillage" although it also is technically not the same type of whole stillage produced with the dry grind process since reduced insoluble solids are present. Other wet mill producers may refer to this type of stillage as "thin" stillage. (See Kohl references cited herein).

It is also possible to produce alcohol from other types of biomass, such as "plant biomass" (i.e., "ligno-cellulosic biomass," i.e., "cellulosic biomass"). Cellulosic biomass conversion to alcohol poses unique fermentation considerations. The *Saccharaomyces cerevisiae* yeast strains used in conventional corn ethanol plants for example, can ferment glucose, but cannot ferment pentose sugars such as xylose to alcohol. Additionally, there is currently no naturally occurring microorganism that can effectively convert all the major sugars present in plant biomass to ethanol. Therefore, genetically engineered yeast or bacteria, which can ferment both glucose and xylose to alcohol, such as ethanol, are being used for biomass to alcohol processes. As a result, the co-products from these processes can contain genetically-enhanced recombinant strains of fermentative microorganisms, including recombinant strains of yeast, bacteria and fungi, as well as transgenic nucleic acids (DNA, RNA).

DETAILED DESCRIPTION OF THE EMBODIMENTS

Emulsions can occur in processing streams as a result of mechanical shearing (e.g., with use of centrifugal pumps). Emulsions can also occur as a result of mechanical shearing in combination with stabilization from the presence of emulsifiers. Such emulsions can include stable and unstable emulsions Conventional methods of bio-oil recovery from processing streams such as thin stillage, for example, are designed to at least partially recover free bio-oil and/or bio-oil present in an unstable emulsion from concentrated thin stillage using mechanical processing and/or heating and mechanical processing.

Some conventional methods utilize "solvent extraction" to recover free oil from stillage, which can include passing a bio-oil/water mixture through a countercurrent vessel containing one or more trays, with a non-polar solvent passed counter to the flow. Such methods utilize a non-polar solvent gas (e.g., butane, propane and mixtures thereof, further including methane, ethane, ethylene, propylene, butylenes, sulfur dioxide, carbon dioxide, $CHF_3$, $CClF_3$, $CFBr_3$, $CF_2=CH_2$, $CF_3-CF_2-CF_3$, $CF_4$, $CF_4$, $CH_3-CF_3$, $CH_2Cl_2$, ammonia, dimethylether, methyl fluoride and halogenated hydrocarbons), but which is thereafter converted into a liquid state.

The free bio-oil can then dissolve in the liquid non-polar solvent and the bio-oil and liquid non-polar solvent are together conducted from the extraction vessel to a separation vessel where the liquid non-polar solvent is removed from the bio-oil by flash evaporation or distillation. (See, for example, U.S. Publication No. 2004/0087808 to Prevost). The free bio-oil is taken up in the non-polar solvent and carried with the non-polar solvent to a separation vessel, where the non-polar solvent can be flash evaporated or distilled from the free bio-oil. The residual water and stable emulsion may phase separate, but the bio-oil in the stable emulsion remains entrapped therein. Additionally, since the content of the free bio-oil is often subject to strict regulation, additional processing steps are often used to remove undesirable materials, such as the non-polar solvent.

Various means have also been attempted to break stable emulsions which may be present in the process stream. Such methods include use of expensive enzymes, expensive microwave processes, or addition of chemicals such as mineral acid (sulfuric acid), which increase the ionic salt content in the stillage. Various other means to break stable emulsions are known, including, but not limited to pH adjustments, such as neutralization. However, the addition of pH neutralizers may allow soaps to form, such as when adding alkali bases to vegetable oils which contain triglycerides) and an undesirable color can be introduced into the final product, due to a Maillard reaction. Other conventional methods may use surfactants, such as polysorbate 80, which can adulterate the resulting co-products, such as animal feed, such that these co-products are no longer acceptable under the Generally Regarded As Safe (GRAS) guideline.

In contrast, the various embodiments described herein do not utilize non-polar solvents, yet are capable of recovering emulsified bio-oil present in a stable emulsion or an emulsion concentrate. Accordingly, embodiments of the emulsion breaking process described herein include a non-mechanical emulsion breaking step, i.e., a chemical process, which utilizes an emulsion breaking additive (hereinafter "additive") added in an amount sufficient to partially or fully break the stable emulsion or emulsion concentrate, thus releasing previously emulsified bio-oil from the stable emulsion or emulsion concentrate (i.e., entrapped bio-oil) to produce recoverable free bio-oil.

Thereafter, the additive can be removed (e.g., flash evaporated) and the broken stable emulsion or broken emulsion concentrate allowed to phase separate in a non-mechanical processing step (e.g., gravity separation) and/or a mechanical processing step, into an aqueous phase and a recoverable bio-oil phase which comprises free bio-oil. In one embodiment, the additive is removed from the bio-oil phase after the phase separating step to produce a recovered additive. Any additive present in the aqueous phase can also be removed to produce additional recovered additive. The recovered additive can then be provided to a desired process stream in the biomass processing facility and/or utilized again in the emulsion breaking process.

In one embodiment, the emulsion concentrate is a bio-oil-in-water emulsion concentrate. In one embodiment, the emulsion concentrate is a water-in-bio-oil concentrate. In one embodiment, the stable emulsion is a stable bio-oil-in-water emulsion. In one embodiment, the stable emulsion is a stable water-in-bio-oil emulsion. In one embodiment, the bio-oil contains triglycerides. The bio-oil in the stable bio-oil-in-water emulsion can be present as droplets dispersed throughout a water column.

Any suitable additive can be used to break the emulsion concentrate or stable emulsion. The specific additive used is dependent on several factors, including, but not limited to, the additive to emulsion ratio of the stable emulsion or emulsion concentrate being treated. The influence of the additive ratio to emulsion can also be quantified as to the amount of emulsified bio-oil recovered from the stable emulsion or emulsion concentrate. The additive can be added, stirred, or mixed into the stable emulsion or emulsion concentrate, and, in one embodiment, is thereafter evaporated.

In one embodiment, the additive is hydrophilic. In one embodiment, the additive is hygroscopic in nature. In one embodiment, the additive decreases surface tension.

The polarity, dipole moment, polarizability and hydrogen bonding of a additive determines what type of compounds it can dissolve and with what other solvents or liquid compounds it is miscible. Examples of additives which can be used herein include, but are not limited to, alcohol-based or carboxylic acid-based solvents including polar protic solvents in which the electronegative atom is oxygen. Such solvents include, but are not limited to, hydrous or anhydrous forms of formic acid, n-butanol, isopropanol, n-propanol, ethanol, succinic acid and acetic acid. Although longer chain alcohols, i.e., penta- and above, may work, their solubility in water decreases as longer carbon chains are formed as the solvent dissolves, causing such alcohols to become increasingly hydrophobic.

In one embodiment, the additive is a native additive, such that it is a component naturally present in lower amounts in various processing streams of a biomass processing facility. Such process streams can include stillage from a biomass processing facility. As such, and depending on the desired final product, additional processing, such as to remove unwanted components, can likely be omitted. Such additives can include the aforementioned additives such as, ethanol, succinic acid and/or acetic acid. In one embodiment, ethanol is used as the emulsion breaking additive in an ethanol processing stream.

In one embodiment, glycerol is used as the emulsion breaking additive and is added in an amount sufficient to break the emulsion, such as between about 20% and about 30% glycerol by volume. In one embodiment, between about 24% and about 26% glycerol by volume is used. In one embodiment, the glycerol to emulsion concentrate (or stable emulsion) ratio is about 1:10 to 1:2. In one embodiment, a partial glyceride may be used as the additive (i.e., esters of glycerol with fatty acids where not all the hydroxyl groups are esterified).

With regard to a stable bio-oil-in-water emulsion, and using ethanol as an example, it is known that ethanol and water are soluble in one another and that bio-oil is sparingly soluble in water. Accordingly, as the ethanol concentration increases (and the water becomes more diluted), the bio-oil in the stable bio-oil-in-water emulsion becomes increasingly soluble and can, in some embodiments, become dispersed throughout the reaction product. Use of an additive described herein, such as ethanol, can, in some embodiments, depending on the amount used and type of the stable emulsion (bio-oil-in-water vs. water-in-bio-oil), allow the emulsion breaking additive to become dispersed throughout the reaction product. Thereafter, the additive can be removed.

In one embodiment, ethanol is native to the ethanol processing stream and is used as the additive. The percentage of ethanol (i.e., proof) can affect the level to which the stable emulsion is broken. In one embodiment, a mixture of 95% (190 proof in U.S.) ethanol in combination with five (5) % water is used and the stable emulsion is broken by at least about 90%, up to substantially 100%. In one embodiment, the ethanol (anhydrous or hydrous) to stable emulsion ratio is about 1:10 to 1:2. In one embodiment, the stable emulsion is broken at least about one (1) % up to about 10% or higher, such as up to about 20%, about 30%, about 40%, about 50% about 60%, about 70%, about 80% or higher, up to substantially 100% including any range there between.

The quantity of bio-oil released from the broken stable emulsion may be determined using a "free oil" test known in the art. (The amount of free oil generated as a result of the emulsion-breaking process described herein may be quantified in a number of ways. In one embodiment, this amount is quantified by volume based upon use of a 98° C. water bath for 30 minutes followed by 10 minute centrifugation at 2300 "G" forces).

In one embodiment, additional emulsion breaking additive recovery steps can be taken if desirable.

Additive concentration and retention time exhibit a relatively linear relationship. Specifically, the (emulsion breaking) reaction rate increases with increasing volumes of additive for a given volume of emulsion. However, in one embodiment, higher additive concentrations utilize increasing amounts of energy for additive recovery.

In one embodiment, the additive amount is selected to meet an objective as to retention time and energy costs. For example, a 1:1 additive to emulsion concentrate (or stable emulsion) ratio by volume (e.g., volume/volume ("v/v")) may cause the emulsion breaking additive to become dispersed throughout the emulsion concentrate (or stable emulsion) almost instantly after which phase separation can begin, whereas a ratio of 1:10 may use more retention time. In one example, the additive and emulsion concentrate (or stable emulsion) have an about 30% to about 70% v/v ratio. In one embodiment, factors such as the amount of water to be removed and retention time can influence the additive to emulsion ratio, which may be between about 10% and about 40% v/v.

In one embodiment, a reduced additive volume can be processed using a greater holding tank volume. In one example, an about 10% to about 20% v/v ratio of additive to emulsion correlates with an about 15 minute to about 25 minute retention time, such as an about 20 minute retention time.

With regard to embodiments intended for use as animal feed, any contact item (additive) must meet certain governmental compliance standards as is known in the art. In one embodiment, ethanol is used as the additive under the appropriate GRAS guideline.

The term "emulsion breaking" described herein can also be referred to as "solvent washing," However, the term "solvent washing" as commonly used by those skilled in the art, does not refer to a process which breaks a stable emulsion or emulsion concentrate as described herein. Rather, the term "solvent washing" is used by others to refer to separation of bio-oil from solids, such as with a counter flow process, without breaking the stable emulsion. Therefore, for clarification, the terms "emulsion breaking" with an "emulsion breaking additive" and the like, are used herein.

In one embodiment, the additive is added after mechanical or gravity separation of the concentrated process stream, such as concentrated thin stillage. In contrast to conventional methods which utilize mechanical processing, with or without added heat, and, in some instances to remove a portion of free bio-oil from the stillage, use of the emulsion breaking additives described herein allows the bio-oil present in a stable emulsion or emulsion concentrate to be liberated. The additive can further release bio-oil bound to components in the process stream, bio-oil trapped by components in the process stream, or both.

In various examples, bio-oil recovery from the stable emulsion or emulsion concentrate can be increased by at least about one (1) % up to about three (3%) or greater, such as about 5%, 10%, 20%, 30%, or greater, such as up to about 50%, further including up to substantially quantitative, including any range there between. The actual percentage improvement is related to the volume of emulsion concentrate (or stable emulsion) naturally present in the stillage prior to being treated, such as with evaporation and/or mechanical processing. In one embodiment recovery of bio-oil from the process stream and/or the emulsion concentrate or stable emulsion present or produced in the process stream is improved by up to 1 or 2 times higher, such as up to about 10 times or higher, including any ranges there between, possibly including orders of magnitude higher (e.g., in the range of hundreds or thousands times higher), as compared to recovery of free bio-oil and/or bio-oil present in an unstable emulsion by merely mechanically processing the process stream or merely heating and mechanical processing the process stream. Such methods are not capable of breaking a stable emulsion or an emulsion concentrate.

FIG. 1 shows a prior art process 100 for processing stillage from an ethanol production process. Stillage can be subjected to dewatering by a variety of means, such as by evaporation or pressing before or instead of providing to a drying zone. In the embodiment shown in FIG. 1, the stillage from ethanol production 102 is provided to evaporators 104 for concentration. A portion or all of the resulting concentrated stillage 106 can be provided to a centrifuge 112 for further separation into free bio-oil 136, de-oiled concentrated stillage 120, and solids 109. The free bio-oil 136 is provided to bio-oil storage 116. The de-oiled concentrated stillage 120 can then be returned to the evaporators 104 as shown, and/or can be provided to the concentrated stillage 106 or concentrated stillage tank 118. Thereafter, the concentrated stillage 106 may be, for example, further processed, and/or taken to a distiller's grain dryer 119 and/or sold as a separate product.

Figure 2:
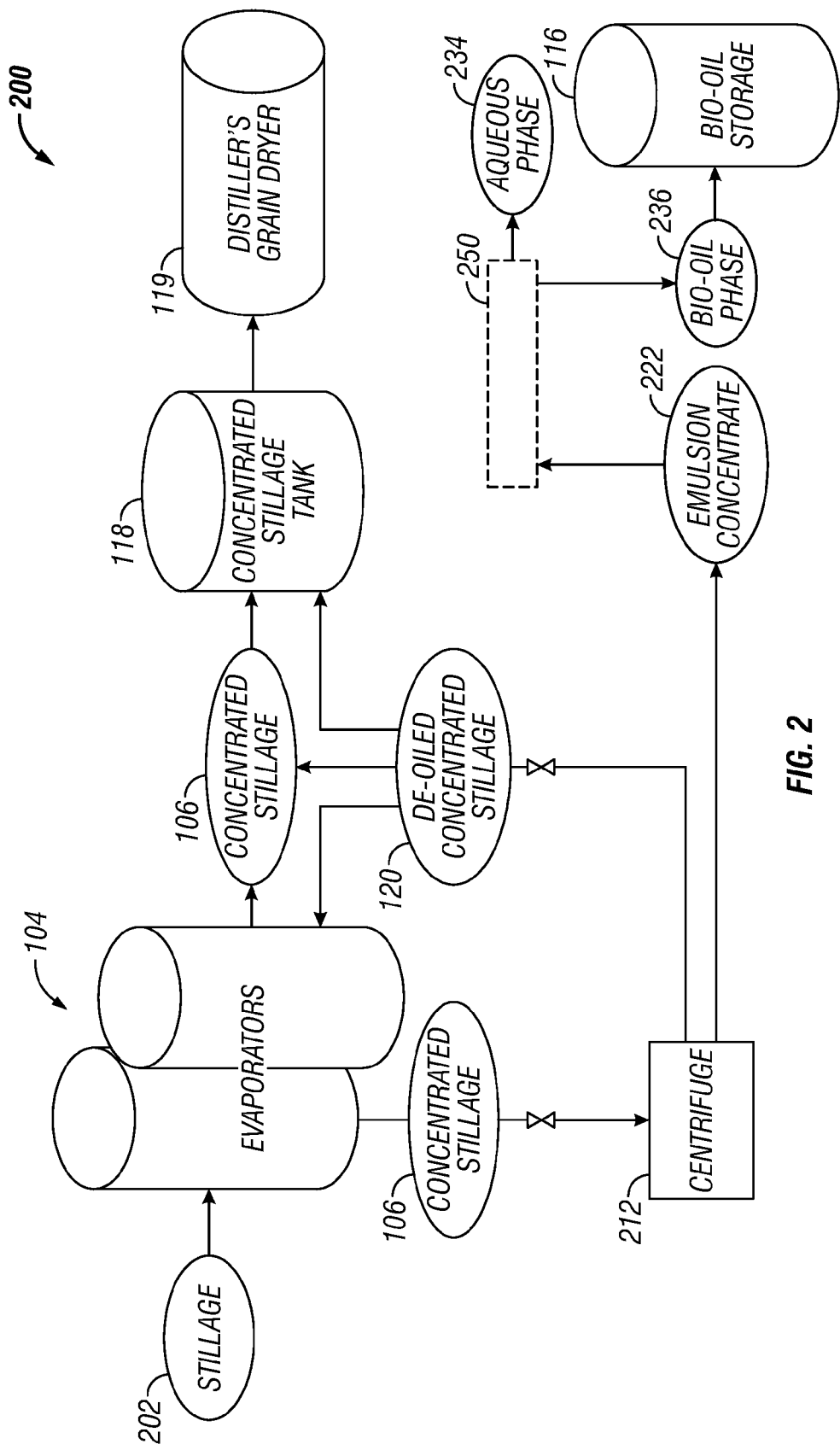
FIG. 2 is a simplified schematic illustration of a bio-oil recovery system according to various embodiments.

FIG. 2 provides an example embodiment of an emulsion breaking system 200 for processing stillage, such as thin stillage from an alcohol production facility, such as butanol or ethanol. The system 200 includes the steps as described in FIG. 1. However, in contrast to using a centrifuge 212 to recover bio-oil (either free and/or present in an unstable emulsion) as is conventional practice, the operation of the centrifuge 212 described herein and shown in FIG. 2 is instead adjusted to dewater or concentrate the concentrated stillage 106. In this way, a stillage stream comprising de-oiled concentrated stillage 220 and an emulsion concentrate 222 can be produced. The emulsion concentrate 222 is thereafter provided to an emulsion breaking/phase separating process 250 as described herein, which produces an aqueous phase 234 and a bio-oil phase 236. In other embodiments, processes prior to the centrifuge 212 can be adjusted so that the centrifuge 212 outputs a stable emulsion.

Figure 3:
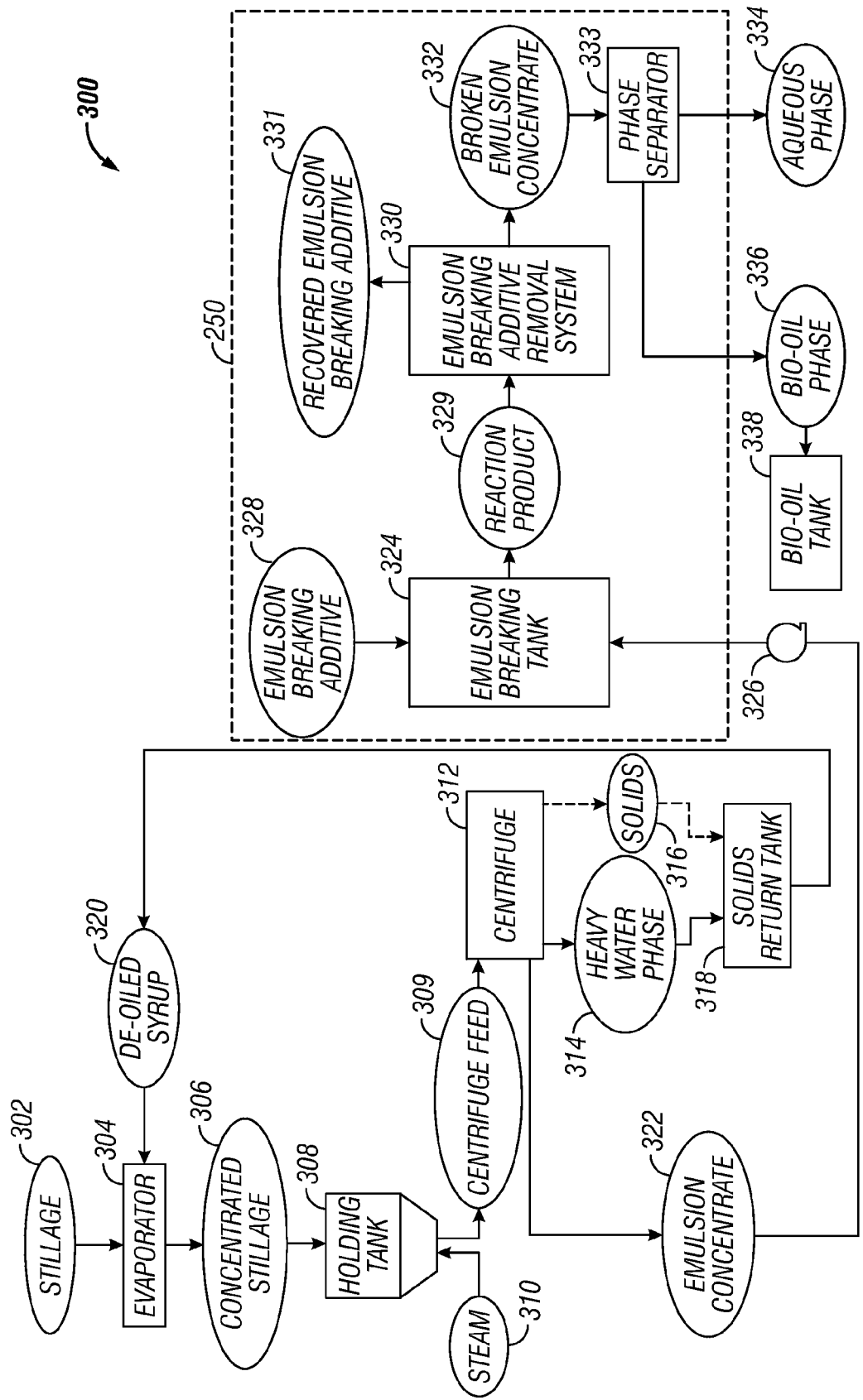
FIG. 3 is a simplified schematic illustration of a bio-oil recovery system which includes a phase separator according to various embodiments.

FIG. 3 shows an embodiment of an emulsion breaking system 300 in which stillage 302 is provided to an evaporator 304. In One embodiment, the stillage 302 has a solids content of less than 20%, such as between about four (4) and about eight (8)%, such as about six (6)%. In one embodiment, the evaporator 304 represents multiple evaporators, such as any number of evaporators, including up to, for example, eight (8) evaporators. In embodiments having eight (8) evaporators, the first evaporator can be run at temperatures as high as about 210° F. (99° C.), with the fourth evaporator run at temperatures between about 200° F. (93° C.) and about 205° F. (96° C.). In other embodiments with fewer evaporators or with one evaporator, the temperatures can vary between about 22° C. and about 121° C., such as between about 130° F. (54.4° C.) and about 210° F. (99° C.), including any ranges there between.

In the embodiment shown in FIG. 3, concentrated stillage 306 having a solids content of greater than 20%, such as greater than about 30% or 40% or 50%, such as about 55%, including any range there between, is withdrawn from the evaporator 304. In this embodiment, concentrated stillage 306 can be withdrawn from the evaporator 304 at temperatures lower than its boiling point. In one embodiment, the concentrated stillage 306 is withdrawn at a temperature of about 205° F. (96.1° C.) or below. In embodiments having eight evaporators, the concentrated stillage 306 may be withdrawn from any of the evaporators, such as from the fourth, fifth, sixth, seventh, and/or eighth evaporators at temperatures of between about 170° F. (76.7° C.) and about 205° F. (96.1° C.). The decision as to which evaporator 304 the concentrated stillage 306 should be removed from depends on several factors, including, but not limited to, the volume % of unstable emulsion present, viscosity of the concentrated stillage 306, and the like, which can vary upon upstream processing conditions. In one embodiment, the stillage 302 is thin stillage and the concentrated stillage 306 is concentrated thin stillage (i.e., syrup). (See, for example, FIG. 4).

Referring again to FIG. 3, the concentrated stillage 306 exiting the evaporator 304 can be at any suitable pH. In one embodiment, the concentrated stillage is at a pH of between about 2 and about 5.8. In one embodiment, the pH may be closer to pH 7. In one embodiment, the pH may be higher, such as about 8.3.

In one embodiment, the evaporator 304 comprises multiple-effect evaporators with forward feeding taking place when the stillage 302 enters the system 300 through a first effect evaporator, which is at the highest temperature. The stillage 302 is then partially concentrated as some of the water vaporized and can be used downstream. This partially concentrated stillage is then fed into a second effect evaporator which is slightly lower in temperature than the first effect evaporator. The second effect evaporator uses the heated vapor created from the first stage as its source of heating. In one embodiment, the evaporator 304 comprises first effect and second effect evaporators which utilize recycled steam.

In one embodiment, the first effect evaporators use steam from a boiler (not shown) in the biomass processing facility to generate process steam. This steam becomes cooled and can be re-used in a distillation step (not shown). In one embodiment, the second effect evaporators also use recycled steam. In one embodiment, direct steam from the boiler is used in the distillation step and the evaporator 304 comprises multiple evaporators which are run "post distillation."

Referring again to FIG. 3, the concentrated stillage 306 can optionally be provided to a holding tank 308 for a suitable retention time. In one embodiment, the retention time is at least 30 minutes. In one embodiment, the retention time is between about 30 and about 60 minutes. In one embodiment, the retention time is only a few minutes up to about 30 minutes. In some embodiments, steam 310 can be added to the holding tank 308 to increase the temperature of the concentrated stillage 306 to a desired level from about 130° F. (54.4° C.) up to about 211° F. (99.4° C.). However, in one embodiment, the temperature of the concentrated stillage 306 exiting the evaporator 304 is close to about 210° F. (98.9° C.), such as between about 130° F. (54.4° C.) and up to less than about 211° F. (99.4° C.), such that no steam is added. It is possible that the concentrated stillage 306 in the evaporator 304 may be at a temperature higher than about 210° F. (98.9° C.), but in various embodiments, the temperature does not exceed its vapor pressure. In one embodiment, the temperature is in excess of the boiling point; however, this may cause some proteins and sugars to burn, thus reducing the heat transfer coefficient of the evaporator 304.

In the embodiment shown in FIG. 3, heat is added to the concentrated stillage 306 in the form of steam 310 while the concentrated stillage 306 is in the holding tank 308 to produce heated concentrated stillage or centrifuge feed 309. Addition of steam can be useful to reduce the viscosity of the concentrated stillage 306 in the holding tank 308. In one embodiment, the added steam 310 can increase the % v/v of stable emulsion present in the centrifuge feed 309. The centrifuge feed 309 can then be provided from the holding tank 308 to a centrifuge 312, or, if no holding tank 308 is used, the concentrated stillage 306 can be provided directly from the evaporator 304 to the centrifuge 312.

The centrifuge 312 can be any suitable type of centrifuge, including but not limited to, a disk stack centrifuge, a hydroclone, a horizontal centrifuge (e.g., decanter or tricanter), a nozzle bowl disk stack centrifuge, and the like. In the embodiment shown in FIG. 3, the centrifuge is a horizontal centrifugal tricanter which has been adjusted to separate the concentrated stillage 306 into a heavy water phase 314, solids 316 and a emulsion concentrate 322. The heavy water phase 314, and, optionally, the solids 316 (such as when the total insoluble solids amount is greater than about three (3) % by volume) can be provided to a solids return tank 318. In one embodiment, the heavy water phase 314 and solids 316, if present, can mix as a result of speed and/or location into which they enter the solids return tank 318 and/or as a result of added mechanical and/or chemical processing. After a period of time, the resulting de-oiled syrup 320 is returned to the evaporator 304.

In one embodiment, the emulsion concentrate 322 is provided to the emulsion breaking/phase separating process 250 via pump 326. Any suitable type of pump 326 can be used. In one embodiment, pump 326 can be a positive displacement pump which reduces or eliminates sheering of components in the emulsion concentrate 322.

Within the emulsion breaking/phase separating process 250, the emulsion concentrate 322 is first subjected to a chemical treatment step. In the embodiment shown in FIG. 3, the chemical treatment step comprises combining an emulsion breaking additive 328 with the emulsion concentrate 322 under conditions suitable to allow an emulsion breaking reaction to occur in an emulsion breaking tank 324 to produce a reaction product 329. In one embodiment, the emulsion breaking additive 328 is dispersed throughout the reaction product 329. In one embodiment, the reaction product 329 is additionally or alternatively subjected to a mixing or stirring step in the emulsion breaking tank 324 at a level and for a time sufficient to cause the emulsion breaking additive 328 to become dispersed to a greater degree and/or more quickly throughout the reaction product 329. The mixing or stifling step can occur within the emulsion breaking reaction tank 324 and/or in the emulsion breaking additive removal system 300 prior to separating into an aqueous phase 334 and a bio-oil phase 336.

The reaction product 329 (which comprises the emulsion breaking additive 328 and a broken emulsion concentrate 332) is provided to an emulsion breaking additive removal system 330 where at least some or most, up to substantially all, of the emulsion breaking additive 328 is recovered to produce a recovered emulsion breaking additive 331 which can then be recycled for use anywhere within the production process which generated the stillage 302.

Figure 5:
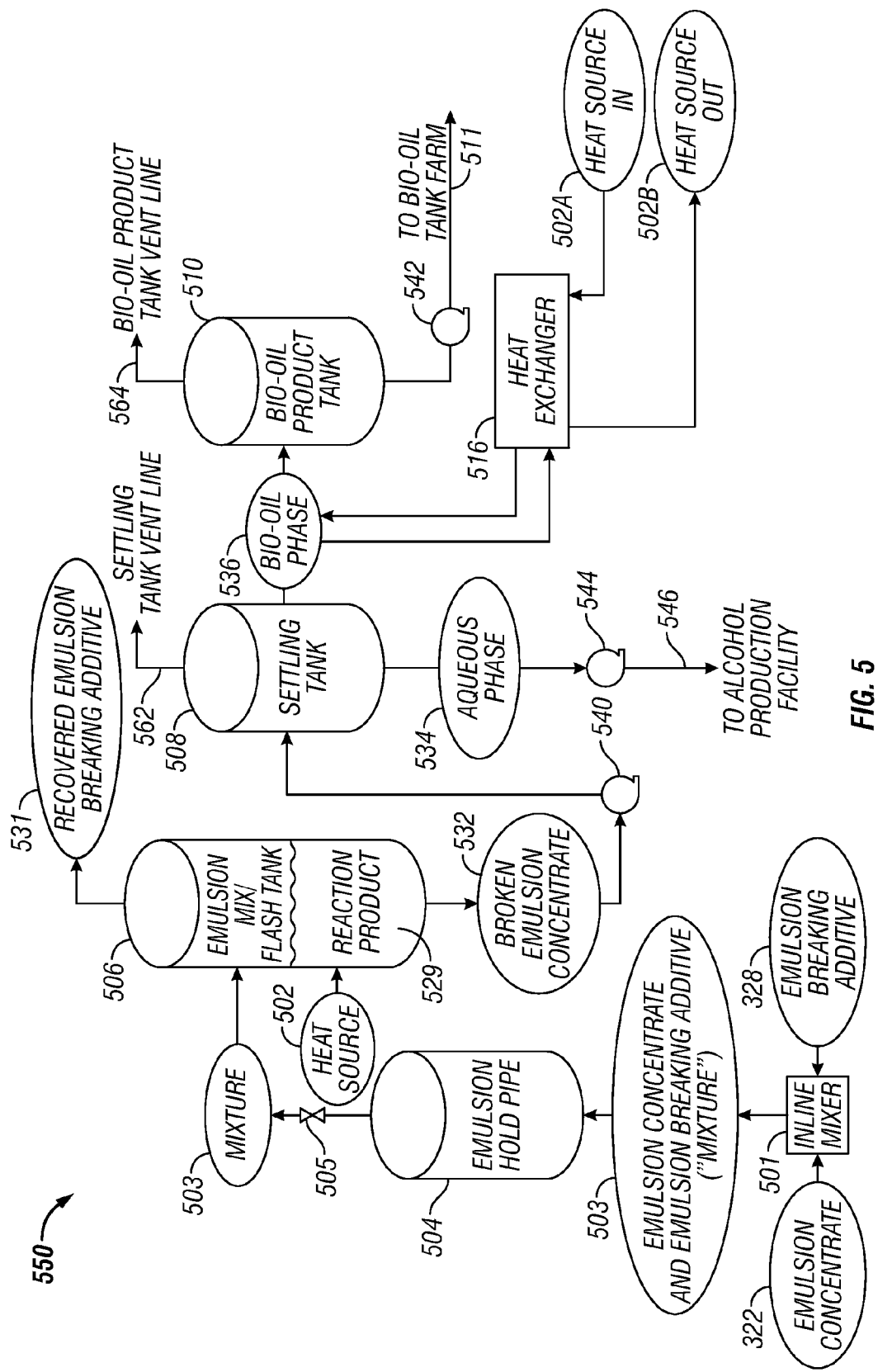
FIG. 5 is a simplified schematic illustration of an emulsion breaking/phase separating process according to various embodiments.

In one embodiment, the emulsion breaking additive removal system 330 and the emulsion breaking tank 324 comprise a single flash tank, such as the emulsion mix/flash tank 506 shown in FIG. 5. In such an embodiment, the reaction product 329 is heated to a temperature above the evaporation temperature of the emulsion breaking additive 331, such that the reaction product 329 is separated within the emulsion mix/flash tank 506 to produce recovered emulsion breaking additive 331 and the broken emulsion 332. (See FIG. 5).

Figure 6:
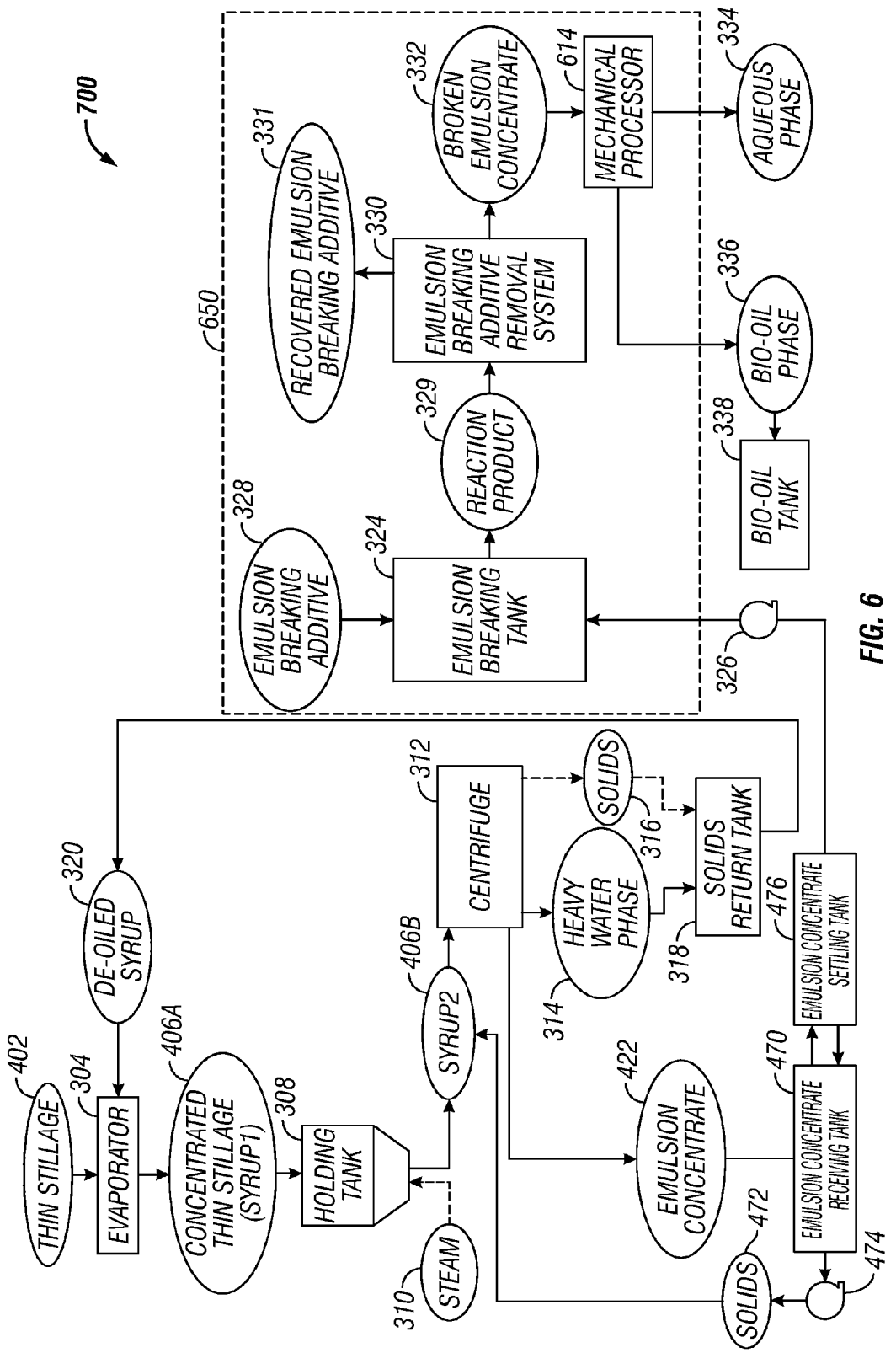
FIG. 6 is a simplified schematic illustration of a bio-oil recovery system which includes emulsion concentrate receiving and settling tanks and a mechanical processor for phase separation following emulsion breaking additive recovery according to various embodiments.
Figure 7:
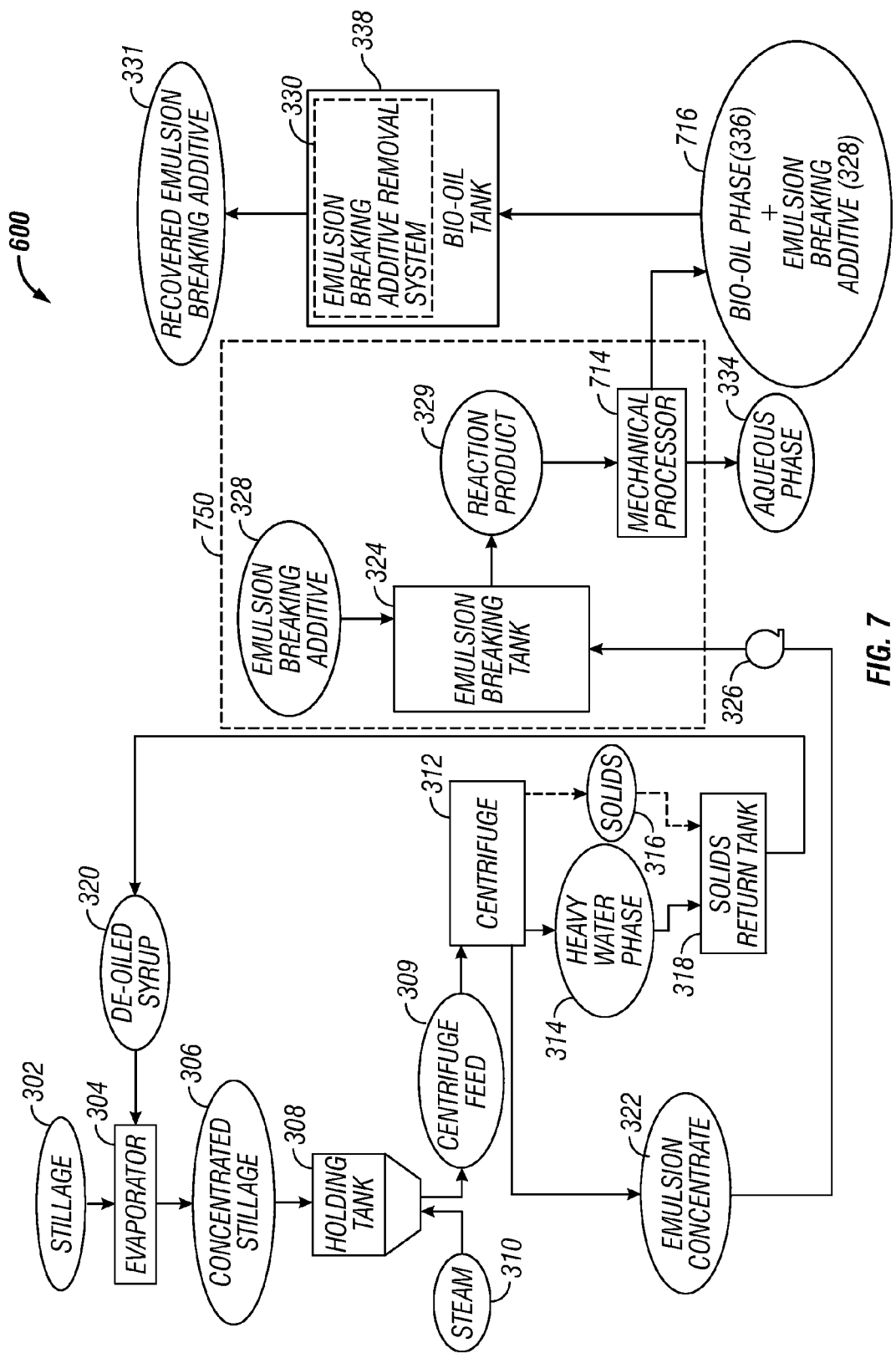
FIG. 7 is a simplified schematic illustration of a bio-oil recovery system which includes a mechanical processor for phase separation followed by emulsion breaking additive recovery according to various embodiments.
Figure 8:
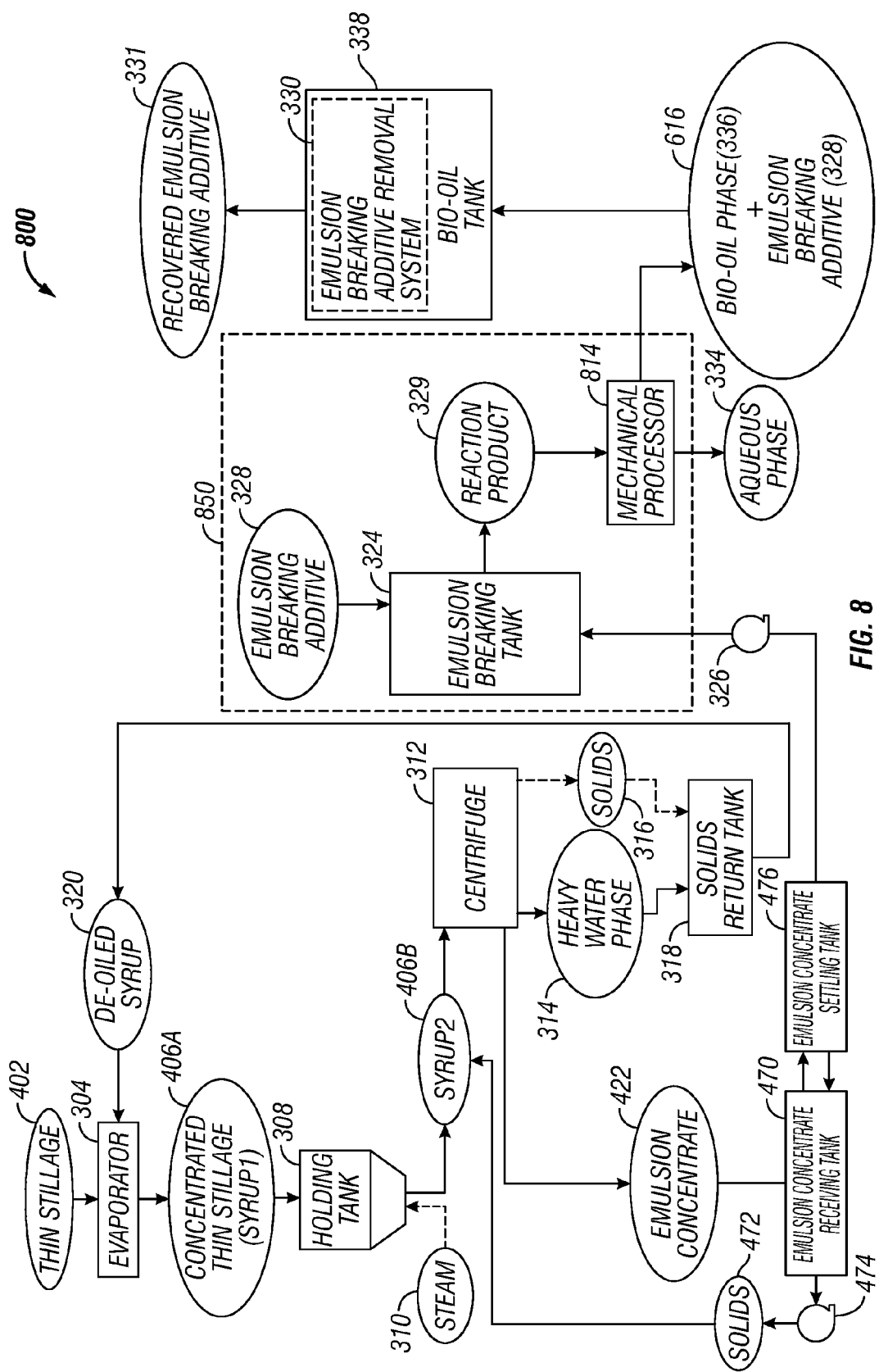
FIG. 8 is a simplified schematic illustration of a bio-oil recovery system which includes emulsion concentrate receiving and settling tanks and a mechanical processor for phase separation followed by emulsion breaking additive recovery according to various embodiments.

In the embodiment shown in FIG. 3, the broken emulsion concentrate 332 is thereafter provided to a phase separator 333 where it can separate into the aqueous phase 334 and the bio-oil phase 336. In one embodiment, the phase separator 333 is a settling tank, such as a gravity settling tank which allows the phases to separate over time using the force of gravity. As such the phase separator 333 is a non-mechanical processor. In other embodiments, such as shown in FIGS. 6-8, the phase separator 333 is replaced with a mechanical processor, namely 614, 714 and 814, respectively, which, in some embodiments, can include a phase separator 333 in combination with a mechanical processor (613, 714, 814) configured to mechanically process the contents therein, which can serve to accelerate and/or improve the phase separation.

Thereafter, the bio-oil phase 336 comprising free bio-oil is provided to a bio-oil tank 338 from which it can be removed by any suitable means for storage elsewhere and/or distribution.

The emulsion breaking/phase separating process 250 can be accomplished by any type of batch system, continuous system, or a combination of a batch and continuous system. In one embodiment, the system is a continuous flow system.

Figure 4:
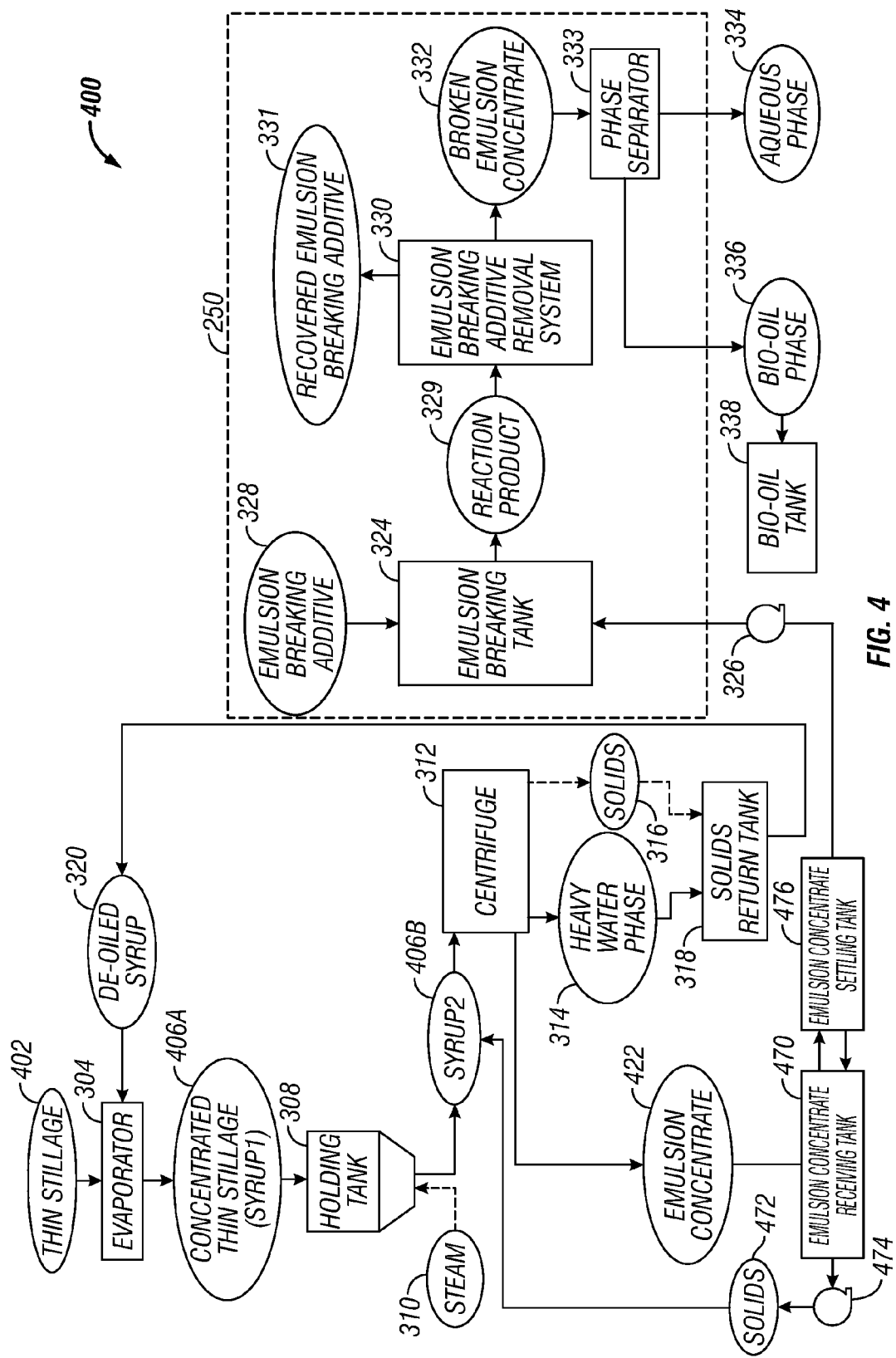
FIG. 4 is a simplified schematic illustration of a bio-oil recovery system which includes a phase separator and emulsion concentrate receiving and settling tanks according to various embodiments.

FIG. 4 provides an example embodiment of an emulsion-breaking system 400 comparable to the system 300 shown in FIG. 3, but which processes thin stillage 402 as shown to produce a concentrated thin stillage (hereinafter "Syrup1") 406A which first enters a holding tank 308 where it can optionally be heated. In one embodiment, a heat source, such as steam 310, is provided to the holding tank 308, such that Syrup1 406A becomes heated and, in some embodiments, can contain additional emulsion, such that "Syrup2" 406B is produced. In one embodiment, no steam 310 or other heat source is provided to the holding tank 308 such that Syrup1 406A and Syrup2 406B are substantially identical in composition and properties. In one embodiment, there is no holding tank 308, and syrup1 406A is fed directly into the centrifuge 312. As with the embodiment shown in FIG. 3, the components exiting the centrifuge 312 include a heavy water phase 314, and, optionally solids 316, which can be provided to the solids return tank 318 and mix as described in FIG. 3. Thereafter, the resulting de-oiled syrup 320 returns to the evaporator 304, such as the next evaporator in series, or alternatively, to a syrup tank (not shown).

Also exiting the centrifuge is an emulsion concentrate 422 which, in this embodiment, is derived from syrup 1 406A, and can be provided as is, or in a more concentrated form (after entering and exiting an emulsion concentrate receiving tank 470 and, optionally, an emulsion concentrate settling tank 476), to the emulsion breaking/phase separating process 250. Specifically, the emulsion concentrate receiving tank 470 and, optionally, the emulsion concentrate settling tank 476, allow a portion of solid impurities, i.e., solids 472, present in the emulsion concentrate 422 to settle out, be removed, and returned to Syrup2 406B using a suitable pump 474. Use of such tanks, 470 and 476, can improve efficiency of the emulsion breaking/phase separating process 250 by allowing the emulsion concentrate 422 to become more concentrated and/or can be provided as a quality control step for the emulsion breaking/phase separating process 250 described in FIG. 3 and also shown in FIG. 4.

In one embodiment, provided as a general reference as to rough proportions of components and flow rates of process streams in a particular embodiment, the process 400 can generate approximately 100 million gallons per year (mpgy) (378.5 million liters (L) per year) plant with flow rates which can exit the evaporator 304 between about 40 gallons per minute (gpm) (151 liters per min (L/min) to 650 gpm (2461 L/min). In this embodiment, the various tanks can be of any suitable sizes. In one embodiment, the holding tank 308 can have a capacity of about 3600 gallons (gal) ($1.4 \times 10^4$ L), the emulsion concentrate receiving tank 470 can have a capacity of about 300 gal (1136 L) and the emulsion concentrate settling tank 476 can have a capacity of about 200 gal (757 L). In one embodiment, stillage can be removed from any evaporator 304 depending on the content and viscosity. In one embodiment, the emulsion concentrate 322 can flow at a rate of about 10 gpm (38 L/min), the emulsion breaking additive 328 can flow at a rate of about 5 gpm (19 L/min), and the bio-oil phase 336 can flow at a rate of about 6 gpm (23 L/min).

In one embodiment, the emulsion breaking/phase separating process 250 shown in FIGS. 3 and 4 can be located prior to the centrifuge 312. In such an embodiment, due to the increased amount of additive that is likely required as compared to the processes shown in FIGS. 3 and 4, adjustments to the equipment, valves, pumps and piping may be made. In one embodiment, the use of higher amounts of additive may require a pressurized centrifuge with explosion-proof motors.

FIG. 5 shows an emulsion breaking/phase separating process 550 which utilizes four separate vessels (504, 506, 508 and 510) to provide a continuous flow system. The emulsion concentrate 322 (422 in FIG. 4) is provided from the emulsion concentrate settling tank 476 (FIG. 4) by pump 326 (FIGS. 3 and 4). However, it is understood that the emulsion breaking/phase separating process 550 shown in FIG. 5 is also applicable to the embodiment shown in FIG. 3.

The emulsion concentrate 322 (422 in FIG. 4) can contain any suitable amount of water. However, the higher the water level, the more dilute the emulsion breaking additive becomes. In one embodiment, the emulsion concentrate 322 (422 in FIG. 4) contains about 70% to about 90% by volume of a stable emulsion in combination with about 10% to about 35% by volume of an aqueous phase. In one embodiment, the emulsion concentrate 322 (422 in FIG. 4) contains about 75% to about 85% by volume of a stable emulsion in combination with about 15% to about 25% by volume of an aqueous phase. In one embodiment, the emulsion concentrate (322, 422) contains up to about 80% of a stable emulsion in combination with approximately 20% by volume of an aqueous phase.

In the emulsion breaking/phase separating process 550 shown in FIG. 5, the emulsion breaking additive 328 is combined or mixed with the emulsion concentrate 322 in an inline mixer 501 to produce a mixture of emulsion concentrate and emulsion breaking additive (hereinafter "mixture") 503. The mixture 503 is then provided to a separate holding tank, i.e., an emulsion hold pipe 504, for a suitable retention time to allow the components to mix, after which it passes through valve 505 into an emulsion mix/flash tank 506, The valve 505 is configured to provide back pressure to the emulsion hold pipe 504. The mixture 503 is flashed evaporated and/or recovered in a manner which allows satisfactory phase separation efficiency. In one embodiment, where the emulsion concentrate (or stable emulsion) is at least 80% emulsion by volume, an additive recovery rate in the range of 80% or greater demonstrated 75% phase separation efficiency.

In one embodiment, the emulsion breaking additive 328 and the emulsion concentrate 322 are preheated (up to lower than the flash point of the emulsion breaking additive 328) prior to mixing, using components known in the art, including, but not limited to a jacketed vessel, heat coils, or heat exchanger.

In one embodiment, the emulsion concentrate 322 is added directly to the emulsion hold pipe 504 and the emulsion breaking additive 328 is added directly to the emulsion mix/flash tank 506. In this embodiment, the emulsion mix/flash tank 506 can contain a mechanical processor, such as an agitator and/or heating systems, such as steam, natural gas, and the like. The temperature can be raised to any suitable level in the emulsion mix/flash tank 506 to allow the emulsion breaking additive 328 to be flash evaporated. In one embodiment, the temperature is raised to about 140° F. (60° C.) up to about 185° F. (85° C.) or higher, such as up to 204° C., or higher, up to a temperature that is still sufficiently low to be below the flash 10 temperature of the emulsion breaking additive 328 (e.g., 425° F. for ethanol).

The retention time in the emulsion hold pipe 504 can vary considerably depending on the content of the process stream. In one embodiment, the retention time is at least about 10 minutes, but could be as high as 30 minutes or higher, such as about 60 minutes or higher, such as about 120 minutes up to about 600 minutes, including any range there between. In one embodiment, a "T" pipe is used instead of the emulsion hold pipe 504 with similar considerations as to retention time.

In one embodiment, the emulsion breaking additive 328 can be mixed with the emulsion concentrate 322 in a tank located on a movable platform (i.e., skid), such as the emulsion concentrate receiving tank 470 or the emulsion concentrate settling tank 476 of FIG. 4.

Referring again to FIG. 5, the mixture 503 exits the emulsion hold pipe 503 and enters the emulsion mix/flash tank 506 via valve 505, where it is subject to conditions which allow the emulsion breaking reaction to occur, resulting in an reaction product 529 (containing a broken emulsion 532 and the emulsion breaking additive 328). In one embodiment, sufficient heat is present in the emulsion mix/flash tank 506 or added via a heat source 502 to serve as an emulsion breaking additive removal system (e.g., 330 in FIG. 3) to evaporate (e.g., flash evaporate) the emulsion breaking additive 328 to produce recovered emulsion breaking additive 531. The ability to flash evaporate the emulsion breaking additive 328 is directly correlated to the phase separation efficiency, i.e., a lower percentage of flash evaporation equals a lower percentage phase separation. Referring again to FIG. 5, the broken emulsion 532 is provided to a settling tank 508 using any suitable type of pump 540.

The broken emulsion 532 can phase separate using gravity into an aqueous phase 534 and a bio-oil phase 536. In other embodiments, the settling tank 508 may be replaced with any suitable type of vessel or column. In one embodiment, the broken emulsion 532 is additionally or alternatively subjected to mechanical processing to cause separation of the phases, such as with any suitable type of centrifuge before, during and/or while in the settling tank 508. In one embodiment, the phases are separated using a vortex mixer. The resulting bio-oil phase 536 containing the bio-oil provided to a bio-oil product tank 510 which can have a bio-oil product tank vent line 564. The bio-oil can thereafter be provided to a bio-oil tank farm 511 via a suitable pump 542.

In the embodiment shown in FIG. 5, the settling tank 506 has a settling tank vent line 562 and the bio-oil product tank 510 has a bio-oil product tank vent line 564. In this embodiment, both tanks (506 and 510) can be held under vacuum in order to recover any remaining emulsion breaking additive 328 not already recovered out of the emulsion mix/flash tank 506 for use in any selected process stream of the biomass processing facility. Holding both tanks (506 and 510) at vacuum also reduces or eliminates release of volatile organic contaminants (VOCs) into the atmosphere.

The separated aqueous phase 534 is discharged or recycled back using any suitable pump 544 and provided (to a desired process stream) in the alcohol production facility 546. In one embodiment, the aqueous phase 534 can be provided to any pre-distillation point in the process. Any emulsion breaking additive 328 not previously recovered and therefore present in the aqueous phase 534 can also be recovered and returned to any selected process stream in the biomass processing facility. In the embodiment shown in FIG. 5, the heat source 502 is also cycled in as heat source "in" 502A and out as heat source "out" 502B of a heat exchanger 516 to heat strip residual emulsion breaking additive 328 from the oil product tank 510 and is subsequently pumped to the bio-oil tank farm 511. In one embodiment, a second heat exchanger (not shown) may be used after the emulsion mix/tank 504 to add additional heat as needed to make sure substantially all the emulsion breaking additive 328 has been evaporated.

In one embodiment, bio-oil still remaining in the aqueous phase 534 is processed again in the emulsion breaking/phase separating process 550. In this way, any emulsion breaking additive 328 not recovered can pass through a distillation step again in the biomass processing facility and/or can be provided again to the emulsion breaking/phase separating process 550.

In one embodiment, addition of the emulsion breaking additive 328 to the emulsion concentrate 322 (or stable emulsion) can, under suitable conditions, cause esters to be produced in the reaction product 329. As such, in one embodiment, the emulsion breaking additive 328 is not removed after the emulsion breaking reaction, but is provided, together with the bio-oil phase (e.g., 336) to a biodiesel production facility for further processing to produce biodiesel.

Movement of the liquids between the various steps in the process (e.g., mixing, flash evaporating, phase separating, etc.) can be provided in any suitable manner depending on the particular application. In one embodiment, a continuous flow is provided such as with any suitable type of pump. In one embodiment a pump that does not cause mechanical shearing and possible re-emulsification (e.g., a positive displacement pump) is used. In one embodiment, the fluids are moved between the various vessels at least in part, using gravity. In one embodiment, gravity is used to move the liquids throughout the process.

In one embodiment, design redundancy is provided by preheating the emulsion breaking additive 328 as the emulsion is approaching the flash point of the emulsion breaking additive 328. By preheating and holding a slight backpressure (i.e., of at least about 10 psi (0.7 atm), such as about 40 (2.7 atm) to about 50 psi (3.4 atm), such as up to about 100 psi (6.8 atm), although the embodiments are not so limited), the emulsion breaking additive 328 can assist with temperature maintenance. As such, a lower pressure (including vacuum conditions) can be used in the emulsion mix/flash tank 506, which allows the emulsion breaking additive 328 to flash evaporate immediately. Since proteins and sugars/starches may be present in the emulsion concentrate 322, use of a lower pressure results in a lower flash temperature, and prevents the proteins or sugars from fouling on any heat transfer surface.

Details of a test run for operation of a commercial biomass processing facility which produces ethanol (hereinafter "ethanol production facility") using the emulsion breaking/phase separating process 550 shown in FIG. 5 are provided in Example 7. In addition to the conditions discussed in Example 7, it is also possible to provide the aqueous phase to the evaporator (e.g., 304) (such as any one of several evaporators, such as the fourth evaporator in an eight-evaporator system) rather than to a point prior to distillation in the ethanol production facility. In this way, any remaining bio-oil in the aqueous phase can pass through the emulsion breaking/phase separating process 550 again within hours rather than days of its first pass, such as within about 1 to 2 hrs up to about 24 hrs, including any range there between. If any residual emulsion breaking additive 328 is present, it can also be recovered.

In the embodiment shown in FIGS. 6-8, the phase separator 333 (FIGS. 3 and 4) is replaced with a mechanical processor 614, 714 and 814, respectively. The mechanical processors 614, 714 and 814 can include a wide variety of machines and devices capable of mechanically processing the reaction product 329 or the broken emulsion concentrate 332 in order to effect at least partial up to substantially complete phase separation of the phases. The initial steps of the embodiment shown in FIG. 6 are comparable to the initial steps of the embodiment shown in FIG. 4. However, in the emulsion breaking/phase separating process 650 shown in FIG. 6, the phase separator 333 is replaced with a mechanical processor 614. In one embodiment, the mechanical processor 614 is a centrifuge, such as a horizontal centrifuge and the emulsion concentrate 422 entering the emulsion breaking/phase separating process 650 has a moisture content of less than 30% by weight, down to about 5% by weight.

The initial steps of the embodiment shown in FIG. 7 are comparable to the initial steps of the embodiment shown in FIG. 3. However, in the emulsion breaking/phase separating process 750 shown in FIG. 7, the entire reaction product 329 is provided to the mechanical processor 714 for separation into the aqueous phase 334 and a processed product 716. In this embodiment, the processed product 716 comprises both the bio-oil phase 336 and the emulsion breaking additive 328, which is provided to the bio-oil tank 338. In this embodiment, the bio-oil tank 338 functions as the emulsion breaking additive removal system 330 to produce the recovered emulsion breaking additive 331, which can thereafter be recycled for use in a subsequent emulsion breaking reaction.

As with FIG. 6, the initial steps of the embodiment shown in FIG. 8 are also comparable to the initial steps of the embodiment shown in FIG. 4. However, the emulsion breaking/phase separating process 850 of FIG. 8 is more comparable to emulsion breaking/phase separating process 750 of FIG. 7 in that the entire reaction product 329 is provided to a mechanical processor 814, which, in this embodiment is a hydrocyclone.

The various process streams can be moved throughout the emulsion breaking processes and systems in any suitable manner. It is desirable in certain process streams to reduce mechanical shear. In such embodiments, a low shear pump, such as a low shear gear pump can be used. Examples of process streams which can benefit from this type of pump include, for example, the stream containing the emulsion concentrate 222, 322, 422, and other process streams which do not contain the emulsion breaking additive 328, i.e., after the emulsion breaking additive 328 has been removed. Such streams may include, but are not limited to, streams containing the broken emulsion concentrate 332.

The present subject matter is further described by reference to the following examples, which are offered to further illustrate various embodiments. It should be understood, however, that many variations and modifications may be made while remaining within the scope of the embodiments described herein.

Example 1

The starting materials were obtained from a commercial corn-to-ethanol production facility (hereinafter "ethanol production facility") which utilizes eight (8) evaporators (#1-8), to produce concentrated stillage (syrup) containing free oil with an containing underlying emulsion concentrate. The syrup was collected between evaporators #6 and #7 and provided to a Z4-444E Tricanter® brand centrifuge (Flottweg) (hereinafter "centrifuge"). The settings of the centrifuge were adjusted to recover a bio-oil-containing product comprising approximately 72% by volume of the emulsion concentrate from the concentrate thin stillage (syrup). Samples were split into two controls, one with the process stream pH at 4.51, and the other in which the pH was adjusted using sodium hydroxide (NaOH) to 6.35.

Tests were run at a given ethanol % v/v. The controls and the pH-adjusted emulsion concentrate were then heated to a temperature of about 180° F. (82.2° C.) through use of a water bath. After reaching the desired temperature, the samples were broken into 20 different 50 ml test tubes, and a dose response based upon ethanol % v/v was performed as shown in Table 1 below.

Substantially pure distilled undenatured anhydrous ethanol (i.e., 199+ proof ethanol in US) manufactured on site at the commercial ethanol facility was added as an emulsion breaking additive in the amounts shown in Table 1 to 50 gram (g) samples of the emulsion concentrate.

TABLE 1

Testing with Ethanol as the Emulsion Breaking Additive

| Sample No. | Ethanol (% v/v) | pH Adjusted? | pH | Appearance after Evaporation (% emulsion by volume) | Ethanol Added (ml) |
|---|---|---|---|---|---|
| 1 | 10 | No | 4.51 | Same as control (no additional emulsion concentrate broken) | 5 |
| 2 | | Yes | 6.35 | Same as control | 5 |
| 3 | 20 | No | 4.51 | Same as control | 10 |
| 4 | | Yes | 6.35 | Same as control | 10 |
| 5 | 30 | No | 4.51 | 50 | 15 |
| 6 | | Yes | 6.35 | 50 | 15 |
| 7 | 40 | No | 4.51 | ~33.3 | 20 |
| 8 | | Yes | 6.35 | ~33.3 | 20 |
| 9 | 50 | No | 4.51 | 0 | 25 |
| 10 | | Yes | 6.35 | 0 | 25 |
| 11 | 60 | No | 4.51 | Minor emulsion, i.e., visible trace amount | 30 |
| 12 | | Yes | 6.35 | Minor emulsion | 30 |
| 13 | 70 | No | 4.51 | 50 | 35 |
| 14 | | Yes | 6.35 | 50 | 35 |
| 15 | 80 | No | 4.51 | 50 | 40 |
| 16 | | Yes | 6.35 | 50 | 40 |
| 17 | 90 | No | 4.51 | 75 | 45 |
| 18 | | Yes | 6.35 | 75 | 45 |
| 19 | 100 | No | 4.51 | 75 | 50 |
| 20 | | Yes | 6.35 | 75 | 50 |

Regarding, the "Appearance after Evaporation," shown in Table 1, some emulsion concentrate samples appeared not to have changed after treatment with the emulsion breaking additive and were noted as having the same appearance as the control, with no additional emulsion concentrate broken. Other samples (i.e., Samples 9 and 10, 50% v/v ethanol) resulted in 0% emulsion ("no emulsion"), indicating that, following treatment, the emulsion concentrate had been substantially fully broken, thus releasing bio-oil from the emulsion concentrate to produce recoverable free bio-oil together with an aqueous phase. A "minor emulsion" contained only a slight visible trace emulsion. Other samples appeared to contain about 33.3% or about 50% or about 75% emulsion as shown. In samples 11-20, high concentrations of ethanol to emulsion concentrate resulted in formation of an emulsion concentrate which may be primarily composed of proteins dissolved by the high concentrations of ethanol (corn zein protein). These observations were visual, and were not subjected to quantitative measurement.

Example 2

This testing involved a batch bench top arrangement to test the feasibility of breaking an emulsion concentrate with ethanol to release the bio-oil (containing starch, sugar, salts and proteins) contained therein and allow it to phase separate. The test was conducted using a pressure-rated 50 US gallons (189.3 L) stainless steel vessel equipped with a steam jacket.

The emulsion concentrate obtained in the same manner as described in Example 1. However, the ethanol in this embodiment was obtained from the commercial ethanol production facility.

The objective was to test ethanol as an emulsion breaker. The test was set up in a batch configuration using a steam jacket, pressure rated, stainless steel vessel with a volume of roughly 50 US gallons (gal) (189.27 Liters (L)). Approximately 12.5 gal (47.32 L) of 200 proof ethanol and 12.5 gal (47.32 L) of corn oil emulsion were added to the vessel, which has a magnet driven, bottom mounted agitator that was set to half speed to mix the emulsion and ethanol. The vessel plumbed low pressure steam at 40 psig (2.72 atm) to the jacket side of the vessel and a temperature of 85° C. was set. On the vapor discharge port of the vessel a Maxchanger® brand fully welded plate and frame heat exchanger (having a length of about 15 ft² (1.4 m²) (Tranter) was added to use as a vapor condenser. The cooling for the vapor condenser was provided by water at about 55° F. (12.8° C.). As the emulsion concentrate heated up, the ethanol was flash evaporated, condensed and recovered. The condensate flow became heavier in volume for a short period of time (roughly 20 minutes) and then began to subside. The vessel had a top mounted sight glass for visual observations within the vessel. As this solvent evaporation progressed there was noticeable vapor in the head space of the vessel.

When vapor was no longer observed in the head space of the vessel it was concluded that the majority of the ethanol had been removed and the heat source was shut off. When setting up the vessel for this test a pressure gauge was installed to observe the vessel pressure for safety. When the vessel showed no stored pressure, the lid was opened. The agitator was then shut off, and it was observed that the turbulence subsided almost immediately. Once the agitator was shut off, it was observed over a period of about 2 to 3 minutes that the emulsion concentrate had been broken, such that the solids had fully precipitated out of suspension, and the bio-oil had coalesced to form a free oil layer over the aqueous phase with solubles. Multiple samples of both the released bio-oil from the bio-oil phase and the precipitated suspended solids were collected for analytical testing.

Additional emulsion breaking tests were conducted using process control variables only. Both tests used the emulsion concentrate from the same batch as previously described, with the ethanol from the same source. Equipment was also the same as described above. In one test run, the ratio of the emulsion concentrate to ethanol was changed from a 50% ethanol and 50% emulsion concentrate, to a 2:1 ratio or 66.7% emulsion concentrate and 33.3% ethanol. The target temperature was set to 85° C. and the rest of the parameters were set the same as the first run to include, pressure, heat source, and condensing source. As a result of using less ethanol, a shorter time was required before the broken emulsion concentrate began to phase separate, with no additional processing required.

Example 3

Additional testing was conducted to determine the point at which the broken emulsion concentrate begins to phase separate, and the length of time required for the suspended solids to fully precipitate. The test results indicated that a 2:1 emulsion to ethanol ratio performed substantially the same as the 1:1 emulsion to ethanol ratio. Solids were observed to precipitate from the bio-oil in less than five (5) minutes, with phase separation resulting in the recovered free bio-oil on top and an aqueous layer (containing suspended solids) on the bottom. Volumetrically, the resulting free bio-oil and ethanol layer appeared to occupy roughly 70% of the sample volume and the aqueous phase appeared to represent about 30% of the sample volume.

Example 4

In order to determine the role of temperature in the emulsion breaking and/or phase separating steps, a target temperature was set to 95° C. As such, with the exception of the target temperature, this testing was configured as described in Example 1, including use of a 2:1 emulsion to ethanol ratio and the same equipment configuration.

The test equipment did not reach the target temperature of 95° C. A maximum temperature of 90° C. was achieved due to the low steam supply pressure and the evaporation rate of the ethanol. No visible gains were observed with the increase in temperature. A darker coloring of the bio-oil and significantly darker color of the suspended solids layer were observed. An increase of organic fouling or deposits of the side walls was also observed during the final cleaning of the vessel. It is believed that the higher temperatures resulted in fouling of the heat exchanger surface from the caramelization of the sugars present in the emulsion concentrate.

Example 5

This testing was configured as described in Example 1, including use of a 2:1 emulsion to ethanol ratio, but with a target temperature of 85° C. After a 20 minute period of observing the vapor condensation rate and vapor in the head space of the vessel through the sight glass, the emulsion concentrate/ethanol mixture was sampled through the vessel sample port and valve. The sample was permitted to rest for approximately 2-3 minutes. No settling of the solids was observed. Ethanol continued to be evaporated off of the emulsified slurry. Samples of the emulsion were pulled in 5 minute increments to identify when the broken emulsion was sufficiently ethanol-deficient to allow phase separation of the resulting free bio-oil and the suspended solids or aqueous phase associated with the emulsion.

The phase separation occurred due to the difference in densities and the hydrophobic nature of the bio-oil. It was determined that if there was an excess of ethanol remaining, phase separation would not occur between the resulting the bio-oil phase and aqueous phase. After roughly 40 minutes of sampling, it was determined there was sufficient ethanol removal to promote facilitate phase separation. The pressure in the vessel was released and the vessel was opened. It was observed the emulsion slurry post ethanol was broken, and the bio-oil phase was observed to rise to the surface.

Example 6

Testing was performed to determine a minimum amount of ethanol to effectively break at least 90% of an emulsion produced by a Z4 Tricanter® brand centrifuge (Flottweg) (hereinafter "centrifuge"). Emulsion concentrate was collected from a centrifuge operating at the same commercial ethanol facility noted in the above examples. A control vial and six 199+− proof distilled denatured anhydrous ethanol solutions (manufactured and obtained on site at the commercial ethanol facility) ranging from 2% to 40% by volume were generated. Specifically, 50 ml samples of emulsion concentrate were collected in laboratory cylinders with graduated markings (hereinafter "cylinder") and placed in a bench top "VWR" analog vortex mixer ("VWR Co.", VM-3000 Mini Vortexer) for a few seconds until they appeared to be fully mixed. Samples were then centrifuged with an Allegra 25R centrifuge (Beckman Coulter) (hereinafter "centrifuge") at 2500 G for 10 min. The volume of remaining emulsion was measured and normalized.

A control of 63% emulsion was used as this was the percentage of emulsion in the process stream exiting the centrifuge on the day of testing, as determined by a conventional spin test known to those skilled in the art and performed on the centrifuge (2500 "G" forces for about 10 minutes).

Since samples were centrifuged at an angle due to the configuration of the cylinder holder in the centrifuge, a reading was taking on each side of the cylinder and then averaged.

In order to measure the amount of volume present in an emulsion phase for a 50 ml sample in the cylinder, the marking for a top emulsion plug (from a first side) and a bottom emulsion plug (from a second side) was noted, with the difference being the volume of emulsion present in the cylinder. The volume % of the emulsion is obtained by dividing the value obtained by the total volume of sample, i.e., 50 ml. In order to account for the added ethanol, which displaces a volume of emulsion, the data was normalized back to a 50 ml sample. For example, for a sample containing 6% ethanol, a correction factor of 94% was applied, i.e., dividing the emulsion volume by 0.94.

Figure 9:
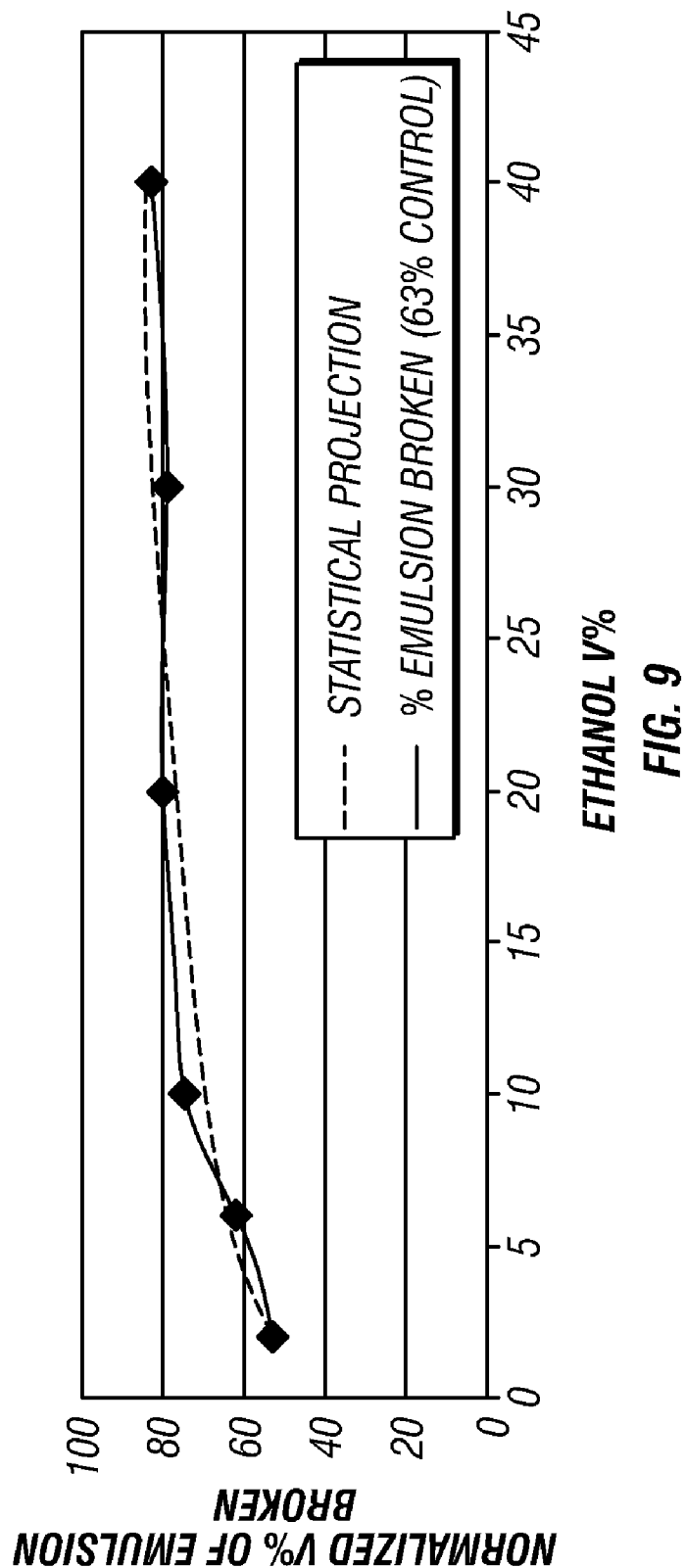
FIG. 9 is a graph illustrating normalized volume (v) % of emulsion broken versus v % of ethanol according to various embodiments.

Table 2 provides test results for the samples tested. Although a slight decline in efficiency can be seen in the results, such differences are statistically insignificant and likely due to slight inaccuracies introduced by estimating fluid level between centrifuge tube declinations. A normalized emulsion breaking curve is shown in FIG. 9. As can be seen in Table 2 and in FIG. 9, a 20% v/v ethanol:emulsion mixture was effective at breaking 96% of the emulsion. In other words, the 20% v/v ethanol:emulsion mixture was "96% effective."

Lower amounts were also surprisingly effective. As little as 2% v/v ethanol:emulsion mixture was effective at breaking a majority of the emulsion, i.e., 63.6%. Additionally, ethanol levels as low as 10% v/v broke nearly 90% of the emulsion in the sample under the same conditions. These results also confirm that an ethanol level greater than about 15% is at least 95.5% effective in breaking the emulsion. As such, ethanol levels between about 15% and about 20% were at least 95.5% up to at least 96% effective in breaking the emulsion. It is expected that ethanol will be at least as effective under other operating conditions, and under certain conditions, could be even more effective. Such operating condition variables can include, but are not limited to, emulsion content, flow rate, solids loading, temperature, pressure, and so forth). However, it is expected that such ethanol levels (of at least 15% up to about 20%, including any range there between) will break at least about 90% of an emulsion during routine operation of a commercial alcohol production facility, such as an ethanol production facility.

As Table 2 shows, ethanol levels as low as 10% v/v broke nearly 90% of the emulsion in the sample under the same conditions. Ethanol levels between 15%-20% resulted in a slightly higher yield, further providing a "buffer" for process deviations during commercial operation.

L/min). As such, the emulsion concentrate:ethanol ratio averaged about 0.38±0.027. This ratio was controlled automatically through a Foxboro distributed control system in conjunction with Wonderware operational software to provide a graphical interface (Foxboro, Calif.). The emulsion concentrate 322 was fed, together with the heated ethanol, into a static inline mixer 501(McMaster Carr 3529K53) where they mixed instantaneously.

The mixture 503 was thereafter provided to the emulsion hold pipe 504 (in-house stainless steel tank having a capacity of approximately 200 gal (747.1 L) and a diameter of approximately 24 in (61 cm) where it remained for about 30 minutes to allow for further mixing of the components. The emulsion hold pipe 504 was held at a back pressure of about 30.45 psig±4.27 psig (2.1±0.3 atm) and at the same temperature of the emulsion concentrate 322 through use of the valve 504.

The mixture 503 then entered the emulsion mix/flash tank 506 having a capacity of approximately 1000 gal (3785.4 L).

TABLE 2

Test Results

| % v/v ETOH | Top Emulsion Plug Marking (first side) | Bottom Emulsion Plug Marking (second side) | Aqueous Phase Marking (first side) | Aqueous Phase Marking (second side) | Emulsion Volume (ml) | Normalization Factor | Normalized Emulsion Volume | v/v % Emulsion Remaining | Normalization corrective factor (%) | % Break of Emulsion (63% control) |
|---|---|---|---|---|---|---|---|---|---|---|
| 0 (Control) | 34 | 34 | 2.5 | 2.5 | 31.5 | 1 | 31.5 | 63 | 100 | 0 |
| 2 | 30 | 4 | 4 | 7.5 | 11.25 | 0.98 | 11.48 | 23 | 36.4 | 63.6 |
| 6 | 25 | 5 | 7.5 | 7.5 | 7.5 | 0.94 | 7.98 | 16 | 25.3 | 74.7 |
| 10 | 17 | 7.5 | 11 | 7.5 | 3 | 0.9 | 3.33 | 6.7 | 10.6 | 89.4 |
| 20 | 17 | 12 | 16 | 11 | 1 | 0.8 | 1.25 | 2.5 | 4. | 96 |
| 30 | 17 | 11 | 15 | 11 | 1 | 0.7 | 1.43 | 2.9 | 4.5 | 95 |
| 40 | 30 | 30 | 4 | 0.1 | 0.1 | 0.6 | 0.17 | 0.3 | 0.5 | 99 |

Example 7

Information provided in this example is directed to an average over a three-day period. It is to be understood that components such as piping, valves, tanks, heaters, pumps and the like, and a control system understood by those skilled in the art, were utilized in this testing although are not described in detail herein.

Commercial testing was performed over a period of several days according to the emulsion breaking/phase separating process shown in FIG. 5 in a commercial ethanol production facility. This example provides details over a three-day period.

Ethanol from this facility was used as the emulsion breaking additive 328. Ethanol was drawn off over this three-day period ethanol at a point in the ethanol production facility prior to distillation at an average rate of about 1.96 gal/min±0.29 gal/min (7.42 L/min±1.1 L/min). The ethanol was then heated with an ITT Standard SSCF-C-04024-4 tube and shell type heat exchanger (not shown in FIG. 5) to a temperature of 204° F. (95.56° C.) (i.e., a temperature much higher than the flash point of ethanol). Adding heat to the ethanol not only improved flash conditions in the emulsion mix/flash tank 504, but avoided burning proteins and sugars present in the emulsion concentrate 322 which otherwise could happen if too much heat is added to the emulsion concentrate 322 directly.

The emulsion concentrate 322 in this testing had an average temperature at this point in the process of about 204.7° F.±12.63° F. (95.94° C.±10.76° C.). Over this three-day period, the emulsion concentrate 322 flowed at an average rate of about 5.13 gal/min±0.8 gal/min (19.4 L/min±3.03

During this testing, the emulsion mix/flash tank 506 was filled to a capacity of about 66.2%±11.46% where it was heated to a temperature of about 154.2° F. (67.9° C.)±6.37° F. (14.24° C.). The emulsion mix/flash tank 506 was held under a vacuum of about 5 to about 6 psia (0.34 to about 0.41 atm) using a rectification column from the ethanol production facility's distillation process. The process of adding the ethanol to water caused the ethanol to "deproof," i.e., reduce from 190 proof to approximately 120 to 130 proof. Holding the contents under vacuum aided the flash evaporation since the vaporization temperature of ethanol was lowered in the process. The contents of the emulsion mix/flash tank 506 were also gently agitated using a Pro-Quip 150 KDU25 agitator.

The heat source 502 used in this testing was an indirect heat source provided by steam condensate coming from the evaporator 304 (shown, for example, in FIG. 4) at a temperature of about 185-205 F. Use of the heat source 502 helped to maintain a temperature in the emulsion in the emulsion mix/flash tank 506 above the evaporation temperature of the ethanol to produce the recovered emulsion breaking additive 531. After the removal of most (approximately 75%) of the emulsion breaking additive 531 the broken emulsion 532 was pumped through pump 540, a PG 6901Waukesha 5050 gear pump which kept mechanical sheering and re-emulsification to a minimum. The broken emulsion 532 then entered the settling tank 508 where it gravity separated into the aqueous phase 534 and the bio-oil phase 536. The settling tank 508 had a capacity of approximately 200 gallons (757 L) and maintained an average level of about 82.9%±11.46%. The aqueous phase 534 flowed at an average rate of about 2.7 gpm±2.1 gpm (10.2 L/min±7.9 L/min).

Any ethanol not recovered was routed to the distillation portion of the ethanol production facility where it was recovered through distillation and is recovered and if any oil is missed it travels back through the process to the emulsion breaking system again for a second pass at recovery.

Bio-oil in the bio-oil phase 536 was then provided to the bio-oil product tank 510 having a capacity of 420 gal (1590 L) The bio-oil product tank 510 was maintained at an average level of about 48.4%. The average temperature of the contents of the bio-oil product tank 510 was 198.7° F.+12.8° F. (92.6° C.±10.7° C.).

A portion of the bio-oil in the bio-oil phase 536 was circulated through the heat exchanger 516, which was an ITT Standard SSCF-C-05024-4, tube and shell type heat exchanger using steam as the heat source 502. Although no flow meter was installed, the positive displacement pump capable of operating at 50 gpm (189 L/min) when at 100% capacity, was run at approximately 85% or approximately 35 gpm (132 L/min). As such, approximately 132 L/min were circulated through the heat exchanger to maintain the temperature in the heat exchanger. Specifically, steam as the heat source in 502A provided heat to the heat exchanger 516 causing the temperature of the bio-oil to increase to about 200° F. (93.3° C.), 516, with direct steam on the other side, 502A and 502B, to heat the bio-oil to around 200 degrees to ensure as a quality control step to get any residual ethanol out of the bio-oil product. The bio-oil product then is sent to the final settling tank farm, 511 via a Waukesha 5050 gear pump.

The aqueous phase 504 was returned to what can be referred to as the "beer well" located just prior to the distillation step at an average flow rate of about 2.7 gpm+2.1 gpm (10.2+7.9 L) through a Johnson 10 gpm (37.85 L) gear pump. As such, any ethanol not recovered, in this instance, approximately 20-25% by volume, was routed back prior to the distillation step and recovered.

Example 8

Testing was conducted for proof of concept of absorbers as a possible emulsion breaking additive. The lab test was conducted using a sample from a commercial ethanol facility which was taken from a point in the process that is equivalent to Syrup1 406A on FIG. 4. The sample was then physically centrifuged in a bench-top centrifuge. Following centrifugation, the sample appeared to be substantially if not fully emulsified. The test utilized 60 ml of the sample and 15 ml of 99.9% pure glycerol. The 75 ml solution was placed on a stirred hot plate with a temperature of 180° F. for 5-10 minutes. The stirred heated mixture was divided equally between two tubes with a capacity of 50 ml each. Each tube was then centrifuged at approximately 3000 "G" forces for approximately 5 minutes.

Observation of the samples post-centrifugation indicated approximately 13 ml of aqueous and solids phase, and 24.5 ml of free oil, demonstrating a sample by volume that was 35% aqueous phase to 65% free oil with the glycerol present throughout the solution. No flashing or other recovery of the emulsion breaking additive was used to break the emulsion. Mechanically induced "G" forces were used to phase separate the free oil from the emulsion.

Example 9

Prophetic

The degree of stability of a stable emulsion or emulsion concentrate produced with the mechanical processing or heating (e.g., with steam) and mechanical processing described herein will be determined. Methods which can be used include monitoring droplet size distribution and concentration during storage, measuring droplet concentration of emulsions, monitoring visible layer boundaries during storage, and test acceleration and ultrasonic or infrared scanning of concentration and droplet-size profile. See, for example, Jochen Weiss, *Emulsion Stability Determination*, Current Protocols in Food Analytical Chemistry, Supplement 3, (2002), John-Wiley & Sons, Inc., and *Liquid-Liquid Coalescer Design Manual*, ACS Separations & Mass-Transfer Products, ACS Industries, LP, Houston, Tex., Http://www.acsindustries.com/separation-technologies/liquid-liquid-coalescers/default.html Apr. 6, 2011, 18 pp (hereinafter "ACS Manual"), both of which are incorporated herein by reference in their entireties). See, for example, FIG. 2 of the ACS Manual, "The Droplet Size Distribution Curve" which shows Volume Fraction of the Dispersion Per Micron versus Droplet Diameter in microns.

CONCLUSION

The specific materials and designs of additional minor components necessary to perform the process, e.g., valves, pumps, lines, and the like, are understood in the art and are not all described in detail herein. The apparatus and method of the invention can further be implemented using a variety of specific equipment available to and understood by those skilled in process control art. For example, means for sensing temperature, pressure and flow rates in all of the flow lines may be accomplished by any suitable means. It will also be appreciated by those skilled in the art that the invention can include a system controller.

Specifically, the system controller can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. Such sensing devices may include, but are not limited to, devices for sensing temperatures, pressures and flow rates, and transducing the same into proportional electrical signals for transmission to readout or control devices may be provided for in all of the principal fluid flow lines. Such a controller may be a local or remote receiver only, or a computer, such as a laptop or personal computer as is well-known in the art. In one embodiment, the controller is a personal computer having all necessary components for processing input signals and generating appropriate output signals as is understood in the art. These components can include a processor, a utility, a driver, an event queue, an application, and so forth, although the invention is not so limited. In one embodiment, the controller has a non-volatile memory comprised of a disk drive or read only memory device that stores a program to implement the above control and store appropriate values for comparison with the process variables as is well known in the art.

In one embodiment, these components are all computer programs executed by a processor of the computer, which operates under the control of computer instructions, typically stored in a computer-readable media such as a memory. In this way, useful operations on data and other input signals can be provided by the computer's processor. The controller also desirably includes an operating system for running the computer programs, as can be appreciated by those within the art. The system controller may also comprise a machine coupled to a control panel. Buttons and dials can be provided on the control panel to allow modification of the values and to control of the agricultural biofuel energy generating system to take the desired steps described herein.

The system controller can also be programmed to ignore data from the various sensors when the operator activates certain other buttons and dials on the control panel as he deems necessary, such as fill override or emergency stop buttons. Alternatively, or in addition to the foregoing, the control panel can include indicator lights or digital displays to signal an operator as to the status of the operation. Indicator lights can also be used to signal that a certain variable level is outside the desired range, therefore alerting the operator to the need for corrective action. In such an embodiment, the corrective action is not automatic, but requires the operator to initiate corrective action either by pushing a specific button or turning a specific dial on the control panel, or by manually adjusting the appropriate valve or device.

Additionally, as is known in the art, in implementing the system described herein, general chemical engineering principles must be adhered to, including accounting for the various types of energy and materials being input to and output from the system, in order to properly size the system. This includes not only the energy associated with mass flow, but also energy transferred by heat and work. In some embodiments, the system is optimized for maximum performance utilizing any known optimization methods known in the art.

By eliminating the requirement to use expensive mechanical processing to enable recovery of emulsified bio-oil bound in a stable emulsion or emulsion concentrate, the systems and methods described herein allow for a more efficient and economical process, while simultaneously providing a higher valued end product. The systems and methods described herein can be easily retrofit into existing alcohol production facilities, such as ethanol production facilities.

In use, there are multiple options as to when and how the emulsion breaking additives can be introduced to and/or recovered from the solutions and process streams.

Embodiments described herein provide a method for recovering bio-oil from an emulsion concentrate or a stable emulsion present or intentionally produced such as with, for example, mechanical processing, in various types of processing streams by using an emulsion breaking additive. In one embodiment, a method is provided comprising combining an emulsion-breaking additive with a bio-oil process stream containing an emulsion concentrate, wherein the emulsion-breaking additive is effective to at least partially breaking the emulsion concentrate to release bio-oil contained therein. The emulsion-breaking additive can be, in some embodiments, native to the process stream.

Various embodiments include a method comprising combining an emulsion-breaking additive with a stable emulsion or an emulsion concentrate, the stable emulsion or stable emulsion containing entrapped bio-oil, wherein the emulsion-breaking additive is effective to at least partially break the stable emulsion (or emulsion concentrate) to produce a broken emulsion (or a broken emulsion concentrate), wherein the entrapped bio-oil is released; and recovering the released bio-oil.

In one embodiment, the method can further comprise separating the broken emulsion concentrate (or stable emulsion) into an aqueous phase and a bio-oil phase; and recovering the bio-oil phase containing free bio-oil with a non-chemical process, such as gravity separation.

In one embodiment, the emulsion breaking process described above is performed on a stable emulsion, such as a stable oil-in-water emulsion containing emulsified bio-oil.

In one embodiment, a bio-oil recovery system comprising a biomass processing facility (e.g., ethanol production facility) having one or more process streams and configured to produce a biofuel and bio-oil-containing co-products, is provided, wherein the bio-oil containing co-products (e.g., concentrated thin stillage, i.e., syrup) contains an emulsion concentrate and the biomass processing facility comprises a dewatering system for dewatering the bio-oil-containing co-products to produce a dewatered bio-oil-containing co-product; and an emulsion breaking system configured to break the emulsion concentrate in the de-watered oil-containing residue. Although specific embodiments have been illustrated and described herein, it will be appreciated by those of ordinary skill in the art that any procedure that is calculated to achieve the same purpose may be substituted for the specific embodiments shown.

This application is intended to cover any adaptations or variations of the present subject matter. For example, although described primarily for use on a stillage stream from an ethanol production process, the emulsion breaking process described herein can additionally or alternatively be used on other oil-bearing streams present in a biofuels, nutraceutical, feed and/or food production process which may contain an emulsion. In yet other embodiments, such as, for example, a biodiesel process, it may be unnecessary to flash evaporate excess emulsion breaking additive, allowing the additive to be reused in the system, thus reducing costs. Therefore, it is manifestly intended that the embodiments be limited only by the claims and the equivalents thereof.

What is claimed is:

1. A method comprising:
dewatering a bio-oil process stream from a biomass processing facility with a mechanical processor to produce a de-oiled process stream and an emulsion concentrate, wherein the emulsion concentrate contains entrapped bio-oil;
combining an emulsion-breaking additive with the emulsion concentrate in an amount sufficient to release the entrapped bio-oil from the emulsion concentrate and produce a reaction product containing released bio-oil and an amount of the emulsion-breaking additive, wherein the emulsion-breaking additive is a polar protic solvent;
removing at least some of the emulsion breaking additive from the reaction product to yield a broken emulsion concentrate; and
phase separating the broken emulsion concentrate to yield an aqueous phase and a bio-oil phase.

2. The method of claim 1 wherein the process stream is a concentrated stillage having a moisture content of about 5% by weight, up to less than 30% by weight and the de-oiled process stream is de-oiled concentrated stillage.

3. The method of claim 2 wherein the combining step is performed at a temperature of about 22° C. to about 121° C.

4. The method of claim 1 wherein the mechanical processor is a centrifuge.

5. The method of claim 4 wherein the emulsion breaking additive is removed with flash evaporation.

6. The method of claim 5 wherein the phase separating is accomplished with gravity separation or with mechanical processing.

7. The method of claim 1 wherein the process stream further contains bio-oil bound to components in the process stream, bio-oil trapped by components in the process stream, or both, wherein the bound or trapped bio-oil is also released.

8. The method of claim 7 wherein the bio-oil is a vegetable oil or animal fat.

9. The method of claim 1 wherein the emulsion breaking additive is heated prior to being combined with the process stream.

10. The method of claim 1 wherein the polar protic solvent is ethanol or glycerol.

11. The method of claim 1 further comprising recovering the released bio-oil in the bio-oil phase.

12. A method comprising:
dewatering a bio-oil process stream from a biomass processing facility with a mechanical processor to produce a de-oiled process stream and an emulsion concentrate, wherein the emulsion concentrate contains entrapped bio-oil;
combining an emulsion-breaking additive with the emulsion concentrate in an amount sufficient to release the entrapped bio-oil from the emulsion concentrate and produce a reaction product containing released bio-oil and an amount of the emulsion-breaking additive, wherein the emulsion-breaking additive is a polar protic solvent;
phase separating the reaction product to yield a broken emulsion concentrate;
mechanically processing the broken emulsion concentrate to yield an aqueous phase and a bio-oil phase, wherein the bio-oil phase contains the emulsion-breaking additive; and
removing at least some of the emulsion breaking additive from the bio-oil phase.

13. The method of claim 12 further comprising recovering the released bio-oil in the bio-oil phase.

14. A method comprising:
dewatering a bio-oil process stream from a biomass processing facility with a mechanical processor to produce a de-oiled process stream and a stable emulsion, wherein the stable emulsion contains entrapped bio-oil;
combining an emulsion-breaking additive with the stable emulsion, wherein the emulsion-breaking additive is a polar protic solvent added in an amount effective to at least partially break the stable emulsion to release the entrapped bio-oil from the stable emulsion and produce a reaction product containing released bio-oil and an amount of the emulsion-breaking additive;
removing at least some of the emulsion breaking additive from the reaction product to yield a broken emulsion;
phase separating the broken emulsion to yield an aqueous phase and a bio-oil phase containing the released bio-oil; and
recovering the released bio-oil from the bio-oil phase.

15. The method of claim 14 wherein the emulsion breaking additive is removed with flash evaporation and the phase separating is accomplished with gravity separation or mechanical processing.

16. A method comprising:
dewatering a bio-oil process stream from a biomass processing facility with a mechanical processor to produce a de-oiled process stream and a stable emulsion, wherein the stable emulsion contains entrapped bio-oil;
combining an emulsion-breaking additive with the stable emulsion, wherein the emulsion-breaking additive is a polar protic solvent added in an amount effective to at least partially break the stable emulsion to release the entrapped bio-oil from the stable emulsion and produce a reaction product containing released bio-oil and an amount of the emulsion-breaking additive;
phase separating the reaction product to produce a broken emulsion;
mechanically processing the broken emulsion to yield an aqueous phase and a bio-oil phase, wherein the bio-oil phase contains the emulsion-breaking additive;
removing at least some of the emulsion breaking additive from the bio-oil phase; and recovering the released bio-oil from the bio-oil phase.

17. A method comprising:
dewatering a concentrated thin stillage stream from an ethanol production facility with a mechanical processor to produce de-oiled concentrated thin stillage and an emulsion concentrate, wherein the emulsion concentrate contains entrapped bio-oil;
combining ethanol with the emulsion concentrate in an amount sufficient to destabilize the emulsion concentrate and produce a reaction product containing released bio-oil and an amount of the ethanol;
removing at least some of the ethanol from the reaction product to yield a broken emulsion concentrate;
phase separating the broken emulsion concentrate to yield an aqueous phase and a bio-oil phase; and recovering the released bio-oil in the bio-oil phase, wherein the released bio-oil phase comprises corn oil.

* * * * *